(12) United States Patent
Zeng et al.

(10) Patent No.: US 11,283,701 B2
(45) Date of Patent: Mar. 22, 2022

(54) TELEMETRY CONFIGURATIONS FOR DOWNHOLE COMMUNICATIONS

(71) Applicant: Halliburton Energy Services, Inc., Houston, TX (US)

(72) Inventors: Jianqiang Zeng, Cypress, TX (US); Sudhir Kumar Gupta, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 43 days.

(21) Appl. No.: 16/751,875

(22) Filed: Jan. 24, 2020

(65) Prior Publication Data

US 2021/0234784 A1    Jul. 29, 2021

(51) Int. Cl.
| | |
|---|---|
| *H04L 12/26* | (2006.01) |
| *H04L 29/08* | (2006.01) |
| *E21B 47/13* | (2012.01) |
| *H04L 43/0894* | (2022.01) |
| *H04L 67/12* | (2022.01) |
| *H04L 43/16* | (2022.01) |

(52) U.S. Cl.
CPC .......... *H04L 43/0894* (2013.01); *E21B 47/13* (2020.05); *H04L 43/16* (2013.01); *H04L 67/12* (2013.01)

(58) Field of Classification Search
CPC ..... H04L 43/0894; H04L 67/12; H04L 43/16; E21B 47/13
See application file for complete search history.

(56) References Cited

U.S. PATENT DOCUMENTS

| | | | | |
|---|---|---|---|---|
| 4,355,310 A | * | 10/1982 | Belaigues | G01V 11/002 340/853.2 |
| 5,560,437 A | * | 10/1996 | Dickel | E21B 47/00 175/40 |
| 5,903,608 A | * | 5/1999 | Chun | H04L 27/2602 375/260 |
| 6,072,779 A | * | 6/2000 | Tzannes | H04L 5/0007 370/252 |
| 6,252,901 B1 | | 6/2001 | Mueller et al. | |
| 6,567,464 B2 | | 5/2003 | Hamdi | |
| 6,657,551 B2 | | 12/2003 | Huckaba et al. | |
| 6,667,991 B1 | | 12/2003 | Tzannes | |
| 7,132,958 B2 | | 11/2006 | Dodge et al. | |
| 7,787,525 B1 | | 8/2010 | Clark, Jr. et al. | |

(Continued)

FOREIGN PATENT DOCUMENTS

| | | |
|---|---|---|
| WO | 2014120988 A1 | 8/2014 |
| WO | 2019050536 A1 | 3/2019 |

(Continued)

OTHER PUBLICATIONS

U.S. Appl. No. 16/778,238; Non Final Office Action; dated Jan. 1, 2021, 22 pages.

(Continued)

*Primary Examiner* — Javier O Guzman
(74) *Attorney, Agent, or Firm* — Gilliam IP PLLC

(57) ABSTRACT

Systems, apparatus, and methods are described for formatting and for performing data communications between a surface modem and one or more modems located in a logging tool of a bottom hole assembly for use in a wellbore environment.

20 Claims, 8 Drawing Sheets

(56) References Cited

U.S. PATENT DOCUMENTS

| | | | |
|---|---|---|---|
| 2001/0010716 A1* | 8/2001 | Smith | H04M 11/002 |
| | | | 379/106.05 |
| 2002/0000316 A1 | 1/2002 | Haase | |
| 2002/0163441 A1* | 11/2002 | Hill | E21B 47/12 |
| | | | 340/855.4 |
| 2003/0010493 A1* | 1/2003 | Hill | G01V 11/002 |
| | | | 166/65.1 |
| 2004/0156264 A1 | 8/2004 | Gardner et al. | |
| 2004/0164876 A1* | 8/2004 | Krueger | G01V 11/002 |
| | | | 340/854.9 |
| 2005/0046592 A1 | 3/2005 | Cooper et al. | |
| 2005/0270171 A1* | 12/2005 | Quintero | G01V 11/002 |
| | | | 340/853.1 |
| 2010/0194586 A1* | 8/2010 | Tjhang | G01V 11/002 |
| | | | 340/854.7 |
| 2010/0295702 A1 | 11/2010 | Zhao et al. | |
| 2012/0249338 A1 | 10/2012 | Merino | |
| 2013/0226461 A1* | 8/2013 | Yu | E21B 47/00 |
| | | | 702/9 |
| 2014/0152457 A1* | 6/2014 | Nishisaka | H04B 3/46 |
| | | | 340/853.2 |
| 2015/0159482 A1 | 6/2015 | Xu | |
| 2015/0229439 A1* | 8/2015 | Stolpman | H03M 13/635 |
| | | | 714/776 |
| 2016/0108723 A1 | 4/2016 | Pietryka et al. | |
| 2016/0298442 A1* | 10/2016 | Orban | E21B 47/13 |
| 2016/0326867 A1* | 11/2016 | Prammer | E21B 17/028 |
| 2017/0261641 A1* | 9/2017 | Fanini | G06F 17/14 |
| 2018/0156031 A1* | 6/2018 | Tran | E21B 47/135 |
| 2018/0220380 A1* | 8/2018 | Croux | E21B 47/14 |
| 2018/0348394 A1 | 12/2018 | Wilson et al. | |
| 2019/0007159 A1* | 1/2019 | Dufour | H04L 1/0003 |
| 2019/0052374 A1 | 2/2019 | Lie et al. | |
| 2019/0112916 A1 | 4/2019 | Song et al. | |
| 2020/0003046 A1 | 1/2020 | Zheng et al. | |
| 2021/0238992 A1 | 8/2021 | Zeng et al. | |

FOREIGN PATENT DOCUMENTS

| | | |
|---|---|---|
| WO | 2021150250 A1 | 7/2021 |
| WO | 2021154308 A1 | 8/2021 |

OTHER PUBLICATIONS

PCT Application Serial No. PCT/US2020/015120, International Search Report, dated Oct. 15, 2020, 3 pages.

PCT Application Serial No. PCT/US2020/015120, International Written Opinion, dated Oct. 15, 2020, 5 pages.

PCT Application Serial No. PCT/US2020/016295, International Search Report, dated Oct. 20, 2020, 4 pages.

PCT Application Serial No. PCT/US2020/016295, International Written Opinion, dated Oct. 20, 2020, 5 pages.

U.S. Appl. No. 16/778,238 Notice of Allowance, dated Apr. 28, 2021, 13 pages.

U.S. Appl. No. 16/778,238 Notice of Allowance, dated Jul. 26, 2021, 5 pages.

* cited by examiner

TELEMETRY CONFIGURATIONS FOR DOWNHOLE COMMUNICATIONS

BACKGROUND

Modern petroleum drilling and production operations demand a great quantity of information relating to parameters and conditions downhole. Such information may typically include characteristics of the earth formations traversed by the wellbore, along with data relating to the size and configuration of the borehole itself. The collection of information relating to conditions downhole, which is commonly referred to as "logging," can be performed by several methods.

For example, in conventional oil well wireline logging, a probe or "sonde" that includes formation sensors may be lowered into a borehole after some or all of the well has been drilled, and is used to determine certain characteristics of the formations traversed by the borehole. The upper end of the probe or sonde may be attached to a conductive wireline that suspends the probe or sonde in the borehole. Power and data or other types of communications may be transmitted to the sensors and instrumentation in the probe or sonde through the conductive wireline. Similarly, the instrumentation in the sonde may communicate information to the surface by electrical signals transmitted through the wireline.

BRIEF DESCRIPTION OF THE DRAWINGS

Embodiments of the disclosure may be better understood by referencing the accompanying drawings.

Figure 1:
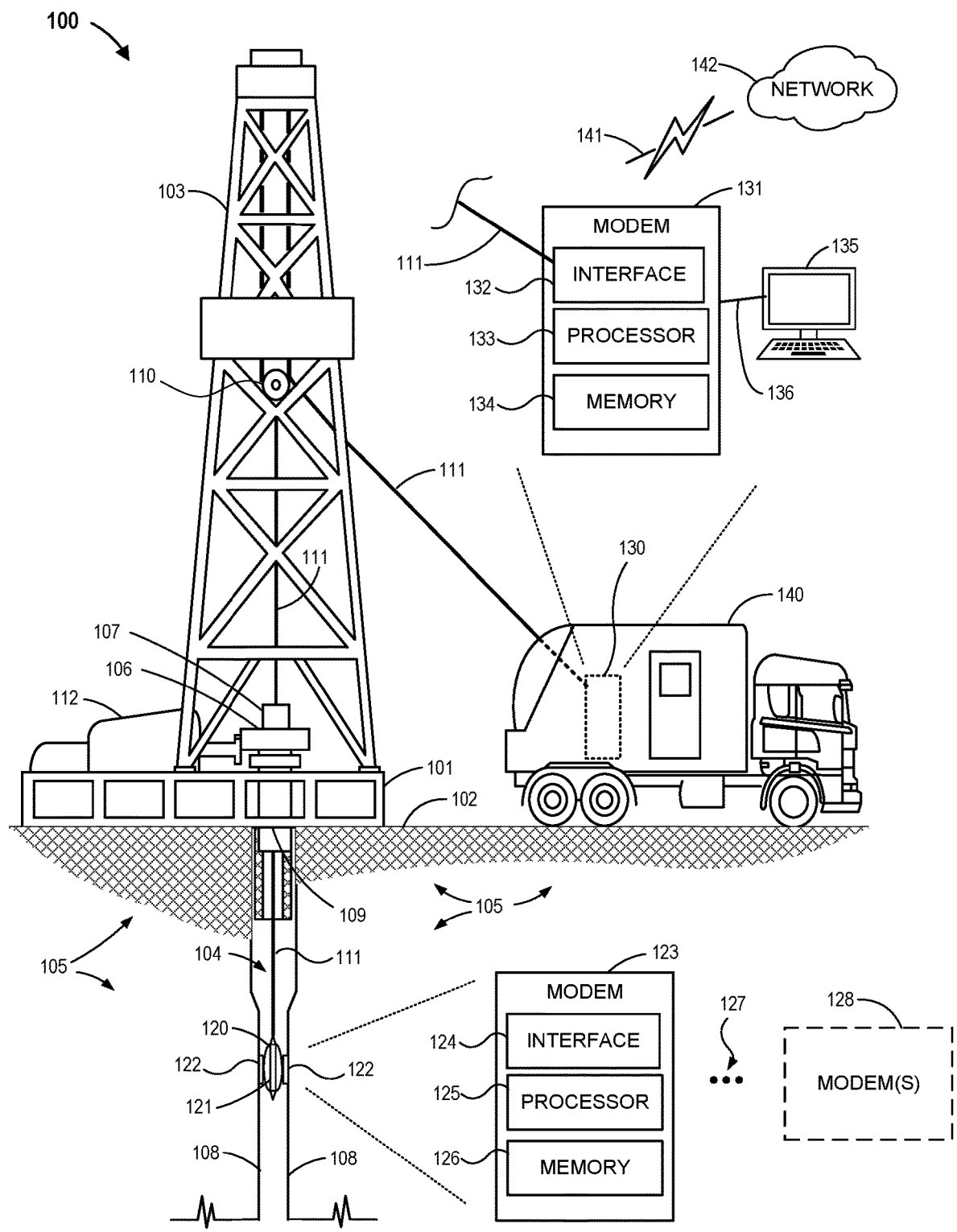
FIG. 1 illustrates a schematic diagram of a logging system for a borehole environment according to various embodiments.

The drawings are provided for the purpose of illustrating example embodiments. The scope of the claims and of the disclosure are not necessarily limited to the systems, apparatus, methods, or techniques, or any arrangements thereof, as illustrated in these figures. In the drawings and description that follow, like parts may be marked throughout the specification and drawings with the same or coordinated reference numerals. The drawing figures are not necessarily to scale. Certain features of the invention may be shown exaggerated in scale or in somewhat schematic form, and some details of conventional elements may not be shown in the interest of clarity and conciseness.

DETAILED DESCRIPTION

In the following detailed description of the illustrative embodiments, reference is made to the accompanying drawings that form a part hereof. These embodiments are described in sufficient detail to enable those skilled in the art to practice the techniques and methods described herein, and it is understood that other embodiments may be utilized and that logical structural, mechanical, electrical, and chemical changes may be made without departing from the scope of the disclosure. To avoid detail not necessary to enable those skilled in the art to practice the embodiments described herein, the description may omit certain information known to those skilled in the art. The following detailed description is, therefore, not to be taken in a limiting sense.

The embodiments described herein relate to systems, apparatus, methods, and techniques that may be used to perform wireline telemetry between one or more modems included as part of logging tools configured for performing logging operations in a borehole environment, and a computer system, such as a surface modem, configured to be positioned outside the borehole and communicatively linked to the logging tools. In performing the wireline telemetry, a minimum data rate for both the data communications from the modems located downhole to the surface modem (which may be referred to as "uplink data" or "uplink communications"), and data communications from the surface modem to the modem(s) located downhole (which may be referred to as "downlink data" or "downlink communications") may be required. Minimum data rates may define a minimum speed, such as the number of data symbols, that the data communications should be capable of transferring per unit of time.

This minimum data rate or rates of data communications may also need to be performed with a maximum bit rate error defining a maximum number of bit errors, which may be defined as bit error occurring per unit time such as per second, that would be acceptable as part of the data communications. Bit errors may be caused for example by switching noise from tools and/or power supplies that generate noise signals imposed onto the data transmission medium, such as a conveyance cable or conductor lines, which are being used to transmit and receive the data communication signals providing the data communications between the logging tools and the surface modem. Bit errors may also be caused by a reduction of the signal strength being provided as the data communications due to transmission media changes caused by temperature changes, and other forces being exerted on the transmission media carrying the data communication, such as stretch, pressure, and physical deformation of the transmission media.

In various embodiment, in order to ensure that the required data rates for uplink and downlink data communications can be met while achieving no more than the maximum allowable bit rate error, a minimum level for the signal-to-noise ratio (SNR) for the data communication signals may be required. In a data communications system providing telemetry between a logging tool and a surface modem, a telemetry training procedure may be performed at initial power up of the logging system in order to determine the available SNR over the communications lines that will allow the required parameters, such as data rate and bit error rates, for the data communications to be met. In some examples of current telemetry systems for logging operations, if the required data rate and the maximum bit rate error are achievable at the minimum level SNR, the data communication system may simply allow the logging tool to perform the logging operations, and the data communication to proceed between the modems using the minimum level SNR. In such examples, dummy data may be sent as part of the data communications to fill the extra available bandwidth being used for the data communications.

Embodiments of the systems, apparatus, methods, and techniques as further described below may be configure to utilize the available tool string information related to the tools and other instrumentation included in a logging tools to transform the extra available bandwidth, and thereby improve the robustness of the data communications, by providing a higher level of noise immunity and/or to lower the overall power consumption required to perform the data communications. Embodiment of the systems, apparatus, methods, and techniques as further described below may be configured to utilize the available tool string information associated with the logging tools to reallocate data bit transmissions to different frequency channels, as further described below, from frequency channels that are known to susceptible to noise, to frequency channels less susceptible to noise signals, based on types of logging tools and instrumentation included in the logging tool, and thus allow data communications to proceed using a higher and thus more robust SNR. In addition, by reallocating the number of bits being communicated on one or more frequency channels being utilized for the data communications, the overall level of power required to perform the data communications may be reduced.

FIG. 1 illustrates a schematic diagram of a logging system 100 for a borehole environment according to various embodiments. System 100 includes a platform 101 positioned on a surface 102, such as the earth's surface, and over a borehole 104 extending into formation 105 below surface 102 and extending between borehole walls 108. Platform 101 supports a derrick 103 extending above the platform 101, and positioned over a top opening 109 of borehole 104. Platform 101 also supports a worktable 106 that may be configured to be driven by a motor 112, such as an electrical or a hydraulic motor, configured to rotate the worktable and in turn a drill string (not illustrated in FIG. 1) that may extend down into the borehole 104. One or more sections of pipe 107 may extend through a central opening in the worktable 106 and through the top opening 109 and into borehole 104 to some distance below surface 102. Pipe 107 may include a central passageway extending through the pipe that is configured to allow a logging tool, such as logging tool 120, to pass through the central passageway of the pipe and be lowered to various depths within borehole 104.

In system 100, a drawworks 110 is suspended from derrick 103 and position over pipe 107. Drawworks 110 is configured to include a mechanism, such as a pulley, that allows a cable, such as conveyance 111, to be positioned so as to align with the central passageway of pipe 107 and the top opening 109 of borehole 104. Conveyance control system 130 is coupled to a proximal portion of conveyance 111, wherein a distal end of conveyance 111 is physically coupled to logging tool 120. Conveyance control system 130 may include a reel and drive mechanism that is configured to extend out more portions of conveyance 111, and to take in portions of conveyance 111 in a controlled manner, thus lowering and raising, respectively, logging tool 120 within borehole 104. Drawworks 110 is configured to pass extended portions of conveyance 111 through the drawworks 110, and thus allow lowing of logging tool 120 through pipe 107 and further depth-wise into borehole 104, and to pull retracted portions of conveyance 111 through the drawworks to allow raising the logging tool 120 up through borehole 104 at some controlled rate, and/or to allow logging tool 120 to be withdrawn complete from borehole 104 through pipe 107. In various embodiments, conveyance control system 130 may be provided as part of a mobile unit 140, such as a truck or a trailer, that may be brought to and removed from the site as part of the logging operation related to borehole 104.

Logging tool 120 itself may include one or more sensors 121 or other instrumentation that may be configured to take measurements related to borehole 104 and/or formation 105 surrounding the borehole while the logging tool is being lowered and/or is being raised within the borehole 104 by control of conveyance 111 using conveyance control system 130. For example, conveyance 111 may comprise a mechanism, such as a cable or a wire, that is configured to support the weight of logging tool 120 throughout the movements of logging tool 120 within, into, and out of borehole 104. In addition, conveyance 111 may include one or more additional electrical conductors, such as conductive wires, multi-conductor cable, or a communication bus that is communicatively coupled to sensors 121, and which may be configured to provide a path for communication signals to be transmitted from and received by sensors 121.

Additional conductors provided throughout the length of conveyance 111 may also include electrical conductor, such as conductive metal wires, configured to provide electrical power, for example electrical power provided by conveyance control system 130, to sensor 121 in order to power the electrical circuits and other devices included in the sensors and/or other instrumentation included in logging tool 120. In various embodiments, electrical power provided by conveyance control system 130 to the logging tool 120 may be used to power one or more electrical power supplies located within the logging tool that are in turn used to power the sensors 121 and/or other instrumentation included in the logging tool.

To provide communications between sensors 121 and/or other instrumentation located in the logging tool 120 and the surface, in some embodiments conveyance control system 130 may include a surface modem 131 communicatively coupled to one or more modems illustrated in system 100 as modem 123 and modem(s) 128. For example, sensors 121 may be coupled to a single modem 123 that provides communications between the sensors and/or other devices that are located in logging tool 120 with surface modem 131. The number of modems that may be included in logging tool 120 is not limited to any particular number of modems, and may include a single modem such as modem 123, or for example modem 123 and one or more additional modems 128, as illustratively represented by modem 128 dots 127. Each of the modems included in the logging tool 120 may be communicatively coupled to surface modem 131 by one or more electrical conductors coupled to the logging tool running throughout the length of conveyance 111. These electrical conductors may be configured to provide one-way or two-way data communications between the surface modem 131 and one or more of the modems located at or within the logging tool 120.

Embodiments of modem 131 may include one or more computer processors 133 (hereinafter "processor 133"), which may include or be coupled to one or more computer memories 134 (hereinafter "memory 134"). Processor 133 may be configured to perform various functions related to the configuration and/or operations of sensors and/or other devices located as part of logging tool 120, in some embodiments based on programs and/or other instructions stored in memory 126. In various embodiments, modem 131 may be configured to perform any of the functions and provide any of the features as described herein related to configuring the telemetry communications between conveyance control system 130 and logging tool 120. Embodiments of modem 131 may include a communications interface (hereinafter "interface 132"). Interface 132 may be configured to provide communications, for example data communications and/or command type communications, to and from modem 123 and any other modem(s) that may be included in logging tool 120 and coupled to surface modem 131 through conveyance 111.

In various embodiments of system 100, modem 131 may be communicatively coupled to one or more other devices, such as computer system 135 for example through a wired or wireless communication link 136. Computer system 135 is not limited to any particular type of computer system, and may include for example a personal computer, a laptop computer, a mobile device such as a smart phone, or any type of electronic device capable of performing electrical communications between the computer system 135 and modem 131. In various examples, computer system 135 may be located at the site near borehole 104, and may include one or more input/output devices, such as a display screen, touch screen, keyboard, and/or a computer mouse that would allow an operator, such as an engineer or a technician, to interact with modem 131 and/or logging tool 120. In various examples of system 100, modem 131 and/or computer device 135 may be communicatively coupled to a network 142 through a wired or wireless communication link 141. Network 142 is not limited to any particular type of network and may include a Local Area Network (LAN) or a Wide Area Network (WAN) that provides communicative coupling between modem 131 and/or computer system 135 and one or more other devices (not shown in FIG. 1) that may be located off site relative to borehole 104, but allow data and/or control related instructions related to the logging operations being or to be performed on borehole 104 to be monitored and/or otherwise controlled via communications provided over the network with modem 131 and/or computer system 135.

Embodiments of modem 123 may include one or more computer processors 125 (hereinafter "processor 125"), which may include or be coupled to one or more computer memories 126 (hereinafter "memory 126"). Processor 125 may be configured to perform various functions related to the configuration and/or operations of sensors 121 and/or other devices located as part of logging tool 120, in some embodiments based on programs and/or other instructions stored in memory 126. A communications interface ("interface 124") may be coupled to the processor 125. Interface 124 may be configured to provide communications, for example data communications, to and from modem 123 with other device(s) coupled to modem 123 through conveyance 111.

In embodiments of system 100 that include more than one modem (as illustratively represented in FIG. 1 by dots 127 and modem 128), each of these additional modems may include any of the devices, such as separate processor(s), computer memory or memories, and/or interfaces that may be configured to perform any of the functions and provide any of the features described above with respect to the corresponding components from modem 123 and/or as otherwise described for these same or corresponding devices as provided throughout this disclosure.

Different embodiments of logging tool 120 may comprise various combination of sensors, logging tools, and/or power supplies configured to operate the sensors and logging tools and other instrumentation. Each of these devices included in logging tool 120 may be defined as part of a tool string service profile that defines the requirements, such as data communication and power requirements, that are applicable to the specific sensors, logging tools, power supplies, and other instrumentation included in the particular configuration of the logging tool 120 to be operated in the performance of a borehole logging operation. When initiating a logging operation for example on borehole 104 using a logging system such as system 100, an operator, such as an engineer or a technician, may open a logging software application on a computer system, such as computer system 135.

Computer system 135 may be communicatively coupled to modem 131. The operator may then load a tool string service profile associated with the configuration of logging tool 120 into the logging software application. Once the operator has loaded the tools string service profile for the particular logging tool configuration associated with logging tool 120 in the logging software application, the requested total telemetry data rate information for the tools string associated with logging tool 120 becomes available as part of the data included in the logging software application. In addition to the total telemetry data rate information, the logging software application may also include a Bit Error Rate (BER) requirement that defines the maximum number of bit errors that are acceptable when transmitting data between the logging tool 120 and surface modem 131 using the requested total telemetry data rate. This total telemetry data rate information and the BER requirement information can be sent from the logging software to the surface modem, such as modem 131 in system 100, via a command generated by the logging software application.

An important parameter associated with data communications is a measurement of signal-to-noise ratio (SNR) of the data communications. SNR provides a relative comparison between a signal level of the desired signal, such as the signal carrying the data being communicated, and a level of any noise signal(s) that may be present on the communication line(s). SNR may be expressed as a measurement in units of decibels (dB). The higher the SNR value, the higher the level the signal power is relative to the noise power levels. In some examples, a target minimum SNR value may be set as part of a data communication format. In general, as the SNR values goes up (larger data signal strength relative to the noise signal level present on the signal), the communications become more robust, and the number of bit error occurring as part of the communication may go down. As SNR values goes down (more noise signal relative to the data signal strength), the bit error rate in general is likely to increase. In additional, as the data rate or baud rate increases, the chances of incurring bit errors may also increase. As such, there is a balance between accomplishing speed with respect to the data rates in view of SNR and an acceptable bit error rate when determining parameters for telemetry data communications.

In addition to SNR values, other parameters that affect or that may need to be applied to the data communications between a logging tool such as logging tool 120 and a surface modem such as surface modem 131 may include data rates and bit error rate. Data rates refer to the amount of data that may be communicated in a given time period. In general, a higher data rate requires the transmission of more data bits per unit time compared to a lower or slower data rate. In addition, a bit error rate may refer to the number of errors that occur with respect to an incorrect bit being transmitted and/or received as part of the data communications relative to a total number of bits transferred as part of the data communication. For example, if one bit in every one million bits being communicated as part of a data communication results in an improper data bit being communicated, the bit error rate may be one in one million, or a bit error rate of $10^{-6}$. In embodiments of data communication systems, a maximum allowable bit error rate may be set as part of the requirements for the data communications in addition to a minimum data transmission rate as part of setting the required parameters for a given data communications setup.

In various embodiments of system 100, a Discrete Multi-Tone (DMT) method of formatting the data being communicated between modems, such as surface modem 131 and tool modem 123, may be used. Although embodiments of these DMT modem-to-modem communications are described with respect to one surface modem, such as modem 131, that is communicating with one tool modem, such as modem 123, these same methods and techniques may be applied to data communications between more than just two modems, for example but not limited data communications between a surface modem 131 and multiple individual tool modems, such as modems 123-128.

Embodiments of a DMT communications formatting may include determining a number of data bits assigned to represent a DMT symbol. A symbol may represent any data item, such as a letter, a number, or other type of symbol such as a decimal point or a punctuation mark. A DMT symbol may include data bits that represent the particular symbol itself, and one or more additional bits, such as parity or check bits, that are included as part of the symbol. The DMT symbols are transmitted over an available bandwidth by separating the available bandwidth into a plurality of frequency bands, which may be referred to as "tones," or "frequency channels," or "channels," each channel assigned to a particular frequency range having a range of contiguous frequencies defining a width for the channel, and including frequencies uniquely utilized by that particular channel. For example, embodiments of DMT data communications may include separating the available bandwidth into a particular number of channels, in some examples 256 channels, which extend over some predefined range of frequencies. Each channel is assigned to a predefined center frequency, and wherein each center frequency is separated from adjacent channels by a predetermined frequency above and below the center frequency for each channel Standard versions of DMT utilize a fast Fourier transform (FFT) algorithm to modulate DMT symbols for transmission at a first modem, and to demodulate the DMT symbols at a second modem receiving the DMT transmission. In various embodiments of DMT data transmission, each channel, modulation utilize quadrature amplitude modulation (QAM). The data is partitioned into symbols of m bits, and each symbol is processed as one unit both by encoder and decoder.

Using a DMT data communication formatting includes sending "bursts" that include some predefined number of data bits assigned to one or more of the plurality of frequency channels that are determined to be "available" to transmits at least one bit of data per burst based on the determined SNR assigned for the data transmission, as further described below. Subsequent sets of data "bursts" are used to communicate a plurality of data bits as part of a DMT data communications format. The rate at which that data "bursts" are transmitted, along with the overall number of data bits included with each burst, determine an overall data rate for the data communications. As further described below, the availability of a particular frequency channel to provide data communications including at least one bit on a given burst of data, and the number of bits that may be provided per burst on a particular frequency channel, may be based at least in part of the signal-to-noise ratio present on that particular frequency channel relative to the determined SNR minimum value being utilized for the data transmission. For example, because the data bits used for the data communications are provided in data bursts, and because the total number of bits that may be included in any given data burst is affected by the number of available frequency channels and the number of bits that may be transferred per burst on each of the available channels, the maximum overall data rate for data transmission using the DMT communications formatting, for example between surface modem 131 and a tool modem 123, may be dictated by the determined SNR value being used for the data communications. The determined SNR value must be set to a SNR value that allows the data communications to occur while meeting the minimum required data rate and while complying with the BER requirement(s) for the data communications.

In various embodiments of system 100, after surface modem 131 receives the information included in the tool string service profile, the surface modem may then use the requested telemetry data rate as the target data rate, and based on the target BER requirement, determine a minimum signal-to-noise ratio, referred to as the "SNR minimum," that is configured to allow for the data transmissions between the logging tool 120 and surface modem 131 to be carried out at the required total telemetry data rates while not exceeding the maximum BER requirement with respect to the bit error rate for the transmissions. Any data communications between the logging tool 120 and the surface modem 131 is therefore constrained to have a value of no less than the SNR minimum because any data transmissions occurring using an SNR value that is less than the SNR minimum value may not guarantee that the data transmissions can be carried out at the minimum required data rate while meeting the requirement for the maximum allowable level for the BER.

In addition to the determined SNR minimum value, each frequency channel has its own SNR that is estimated for each channel. The number of data bits that may be allocated for one burst of data on a particular frequency channel may be determined by the level of the SNR for that particular channel relative to the SNR minimum value, or for example a higher determined SNR value that may be assigned to the data communications. For example, for any frequency channel having a SNR for that particular channel that is less than the SNR minimum value, that particular channel may be considered as being unavailable for allocation of data bits to be transmitted in a data burst. For any frequency channels having an SNR for that particular channel that is at least equal to or above the SNR minimum value may be considered as an available channel, and one or more data bits may be allocated to be transmitted on that frequency channel as part of a data burst.

The number of data bits that may be allocated to any particular available frequency channel in various embodiments is based on the difference between the estimated SNR value determined for that particular channel and an overall determined SNR value being used for the data transmissions for at least that particular channel, or in some embodiments, for all the available frequency channels. By way of illustration, for a particular frequency channel X being utilized as part of data transmission in a DMT data format, for every 3 dB that the estimated SNR for channel X exceeds the determined SNR value selected for using in the data transmissions, one data bit may be allocated to that channel Therefore, if channel X is determined to have an estimated SNR value that is 9 dB above the determined SNR value selected for the data communications, three data bits (one data bit each of the 3 dB over determined SNR value) may be allocated to channel X.

Based on the total number of available channels, and based on the total number of bits that may be allocated to each of the available channels using the estimated SNR for each individual available channel and the determined SNR value for the overall data transmissions, a total number of bits that may be allocated to a give data burst may be made. In further view of the number of data bits required to transmit one symbol, and the rate the data bursts may be transmitted, an overall data transmission rate for the given overall determined SNR value may be determined. If the allocated number of bits meets or exceeds the requirements for data rate transmission, and if the determined SNR is higher than the SNR minimum value, the data transmissions between the modem(s) of logging tool 120 and the surface modem 131 may proceed using the higher determined value of the SNR associated with the data transmission, which is configured to provide data transmission while meeting the requirements for the maximum BER.

Embodiments include surface modem 131 and/or modem 123 beginning modem training by transmitting a signal including a known symbol at a predetermine signal strength to the respective modem configured to receive data transmission from the transmitting modem. For example, surface modem 131 may initiate modem training by transmitting a known symbol, using a DMT communications format, to modem 123 using a predetermined signal strength on each of the frequency channels assigned for downlink data transmissions. Upon receiving the transmission including the known symbol, and knowing the predetermined signal strength, modem 123 determines the received signal strength, and thereby determines an estimated SNR for downlink data transmission, individually, for each of the frequency channels assigned for downlink data transmissions.

Individual estimated SNR values for each frequency channel may be different from other estimated SNR values of other frequency channels and/or a same value compared to one or more other the frequency channels, and may be used, as further described below, to determine the allocation of a different and/or a same number of data bits, respectively, to the individual frequency channels. These estimated SNR values may then be transmitted to the surface modem for use in determining a SNR value and for determining data bit allocations to the frequency channels to be utilized for downlink data communications. In a same or similar manner, modem 123 may transmit to surface modem 131 a known symbol having a predetermined signal strength over each of the frequency channels assigned to transmit uplink data communications between modem 123 and surface modem 131. Upon receiving the transmission including the known symbol, and knowing the predetermined signal strength, surface modem 131 determines the received signal strength, and thereby determines an estimated SNR for uplink data transmissions, individually, for each of the frequency channels assigned for uplink data transmissions.

Once the individual estimated SNR values for the frequency channels have been determined, in various embodiments surface modem 131 initiates an iterative process of allocating data bits to the available frequency channels using one or more proposed SNR values, referred to as the SNR margin level, to determine the number of data bits that may be allocated to each available frequency channel at the proposed SNR values, and thus determines whether the required data rate(s) may be achieved using a data transmission having a determined SNR that is higher than the SNR minimum value, and thus a more robust data transmission, while provided data transmission in both the uplink and downlink directions with at least the minimum required data rate and while meeting the requirement for a maximum BER.

Once a higher value for a proposed SNR margin value has been determined that meets these data transmission requirements, modem training may end, and logging operations may begin including data transmissions between the surface modem 131 and modem 123 using a DMT communications format and a bit allocation to the available frequency channels based on the determined higher value for SNR. In various embodiments, as a result of conducting the modem training, a determination may be made that the required data transmission rate meeting the BER requirement may not be achieved based on any of the proposed SNR margin values, or by using the SNR minimum value. In such instances, modem 131 may provide an output warning message indicative of the issues with the data transmission, wherein the warning message may be output to a computer system, such as computer system 135, and/or output over communication link 141 to one or more devices communicatively coupled to network 142.

In various embodiments, an operator such as an engineer or a technician, may make adjustments to the system, for example by providing instructions to system 100 causing the system to place one or more devices, such as logging tools or power supplies, devices into a silent mode, wherein these devices may be considered to be noisy device(s), and thus reduce the tool string data rate requirement so that the data transmissions may conform to the data rate, SNR, and BER requirements for these data transmissions.

Figure 2A:
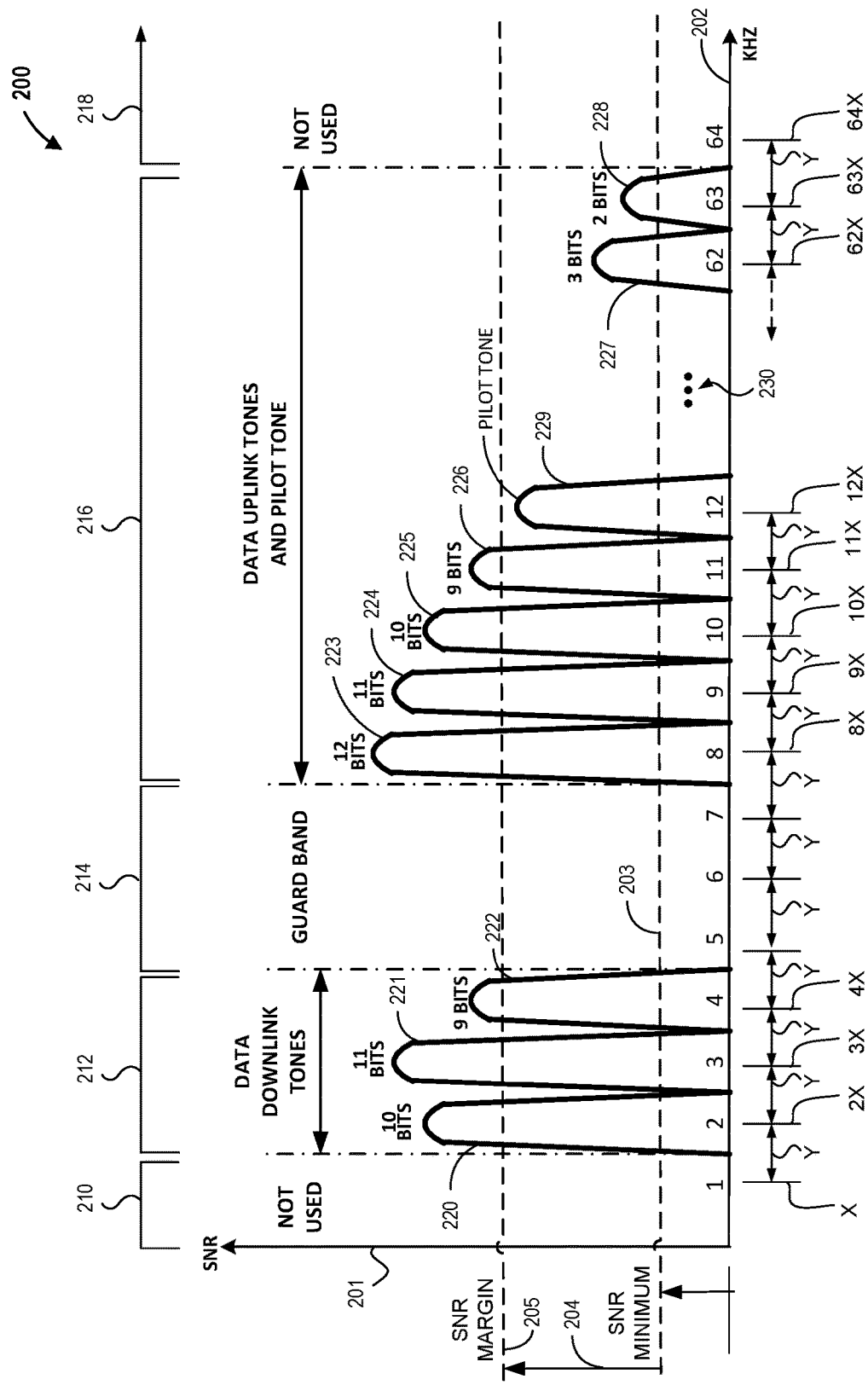
FIG. 2A illustrates a graph showing frequency tones utilized in a discrete-multi-tone telemetry system according to various embodiments.

FIGS. 2A-2E represents various embodiments of frequency tones that may be used in a DMT communication format. Any references to particular frequencies and to ranges of frequencies as depicted in these figures are intended as illustrative and non-limiting examples, and other frequencies and ranges of frequencies are possible and contemplated for use with embodiments as described herein, and any equivalents thereof. FIG. 2A illustrates a graph 200 showing various frequency tones utilized in a DMT communication format according to various embodiments. Graph 200 includes a vertical axis 201 representing levels of signal-to-noise ratio (SNR), having increasingly larger values in the upward direction, and a horizontal axis 202 representing frequencies, for example but not limited to frequencies in in the kilohertz (kHz) range, and which increase in frequency when moving along axis 202 to the right. Brackets 210, 212, 214, 216, and 218 as shown in graph 200 represent illustrative and non-limiting respective frequency ranges that may be utilized as frequency channels for of the data communications included in the DMT communication format depicted by graph 200. As illustrated in FIGS. 2A-2E, each of the channels is assigned a center frequency, such as X, for channel 1, 2X for channel 2, 3X for channel 3, 4X for channel 4, etc., which is unique to that particular channel. Further, each center frequency may be separated from the immediately adjacent frequency channels by a predefined frequency "Y". In various embodiments, the channels being utilized for data communications may be spaced apart from one another by frequency "Y" and extend over a range of frequencies, such as a range extending from 6 kilohertz to 300 kilohertz. In various embodiments, the predefined frequency "Y" may conform to a standard frequency used for standardized DMT communication schemes, which may utilize a predetermined frequency of separation between channels of 4.3125 kilohertz.

Bracket 210 represents a first frequency range, and as shown in graph 200, represents frequencies that may not be used or available for data communications in the embodiments of the DMT communication format. Bracket 212 represents a second frequency range that may be utilized for tones assigned to frequency channels associated with data downlink communications.

Bracket 214 represents a third range of frequencies that includes a guard band range of frequencies. The guard band may be utilized to provide assured separation of the tones of the frequency channels being utilized for downlink communications from the tones of the frequency channels being utilized for uplink communications. Bracket 216 represents a fourth frequency range including frequencies that may be used for tones assigned to frequency channels associated with data uplink communications, and a pilot tone. Bracket 218 represents frequencies extending above the fourth range of frequencies, and includes frequencies that may not be used for communications in the embodiments of the DMT communication format.

As illustrated in graph 200, the various frequency ranges represented by at least brackets 212 and 216 may be divided into separate "tones" or "channels" or "frequency channels." Each frequency channel is centered around a separate and different center frequency unique to that frequency channel. These individual frequency channels are indicated by numbers, 1 through 12 and 62 through 64, as shown in graph 200 extending along horizontal axis 202. For example, a channel 1 is shown positioned within the frequency ranges included below bracket 210. No data bits are allocated to channel 1 as depicted in graph 200. Three separate channels, numbered 2, 3, and 4, are illustrated in graph 200 within the data downlink tones including frequency channels indicated by bracket 212. Channel 2 (ref. number 220), includes a tone having a center frequency at "2X", with 10 bits allocated to channel 2. Channel 3 (ref. number 221), includes a tone having a center frequency at "3X", with 11 bits allocated to channel 3. Channel 4 (ref. number 222), includes a tone having a center frequency at "4X", with 9 bits allocated to channel 4, Channels 3, 2, and 4, as depicted in graph 200, are the frequency channels dedicated to communicate downlink data, for example communication data being transmitted from a surface modem (e.g., modem 131, FIG. 1) to one or more modems (e.g., modems 123, 128, FIG. 1) of a logging tool.

Seven separate frequency channels are illustrated in graph 200 within the data uplink tones as generally indicated by bracket 216. Channel 8 (ref number 223), includes a tone having a central frequency at "8X", and having 12 bits allocated to channel 8 Channel 9 (reference number 224), includes a tone having a central frequency at "9X", and having 11 bits allocated to channel 9. Channel 10 (ref number 225), includes a tone having a central frequency at "10X", and having 10 bits allocated to channel 10. Channel 11 (ref number 226), includes a tone having a central frequency at "11X", and having 9 bits allocated to channel 11. Channel 62 (ref. number 227), includes a tone having a central frequency at "62X", and having 3 bits allocated to channel 62. Channel 63 (ref number 228), includes a tone having a central frequency at "63X", and having 2 bits allocated to channel 63.

Channels 8 through 12, 62, and 63, as depicted in graph 200, are the frequency channels dedicated to communicate uplink data, for example data communications transmitted from one or more modems (e.g., modems 123, 128, FIG. 1) of a logging tool to a surface modem (e.g., modem 131, FIG. 1). Additional channels, such as channels 13 through 61, which are illustratively represented in graph 200 by dots 230, may be included within the frequency range indicated by bracket 216, and in various embodiments may be utilized as addition channel(s) for uplink communications, but are not depicted in graph 200 for simplicity purposes only. In addition, the uplink tones included within the range of frequencies indicated by bracket 216 may also include a pilot tone, illustrated as channel 12 (ref. number 229), having a central frequency at "12X". Additional frequencies, not specifically illustrated in FIG. 2A, may be assigned to the downlink tones, but are not depicted in graph 200 for simplicity purposes only.

As shown in graph 200, channel 1 has a center frequency positioned to the left of channel 2, and has a lower center frequency compared to channel 2, and is not allocated any bits for data communication. Channel 64, having a center positioned to the right of channel 63, has a higher center frequency relative to channel 63, and is not allocated any bits for data communication. As such, the frequency ranges included in channels 1 and 64 may act as guard bands below and above, respectively the frequency ranges over which the data communications depicted by graph 200 are supposed to operate within.

In addition, frequency channel 5 having a center frequency at "5X", frequency channel 6 having a center frequency at "6X", and frequency channel 7 having a center frequency at "7X", include frequencies between frequency channels 4 and 8. Frequency channels 5, 6, and 7, as depicted in graph 200, are not allocated data bits, and are labeled as providing a guard band between the frequencies allocated bit assigned to data downlink communication and frequency channels allocated data bits assigned to the upline data communications. These guard band may help minimize or eliminate cross-talk between the downlink communication being performed by channels 2 through 4 and the uplink communication that may be performed using channels 8 through 12, 62, and 63.

As shown in graph 200, each of tones 2 through 4, 8 through 12, 62, and 63 includes a signal-to-noise ratio level, indicated by the peak of the frequency tone, that is specific to that frequency channel, and that is above the SNR minimum indicated by line 203. As further described above, modem training may include determining an estimated SNR for each of the frequency channels. The number of bits that are allocated to a particular frequency channel may be determined based on the amount that the estimated SNR value for that particular channel exceeds the SNR minimum level. In some embodiments, one bit may be allocated to a tone for every 3 dB that the SNR for that tone exceeds the SNR margin level.

Using tone 2 as an example, 10 bits have been allocated to tone 2. In various embodiments, the allocation of 10 bits to tone 2 would be based on tone 2 having an estimated SNR that is 30 dB (3 dB times 10 bits) above the dB level set for the SNR minimum value. As shown in FIG. 2A, each of these frequency channels 2-4, 8-12, 62, and 63 would meet the SNR requirements for a tone that may be used for data transmission of one or more bits when the SNR for the data transmission by having an estimated SNR level that is at least a minimum level, for example 3 dB, above the level of SNR minimum as indicated by dashed line 203. In alternative embodiments, one or more of the frequency channels may not be capable of providing a signal-to-noise ratio level that is above a proposed or minimum SNR level, as further described below with respect to FIG. 2B. In such instances, these channels may not be used for data transmission, and any bits initially allocated to these tones may be reallocated to other tones that can accommodate an allocation of additional bits.

The dashed line 203 represents, in various embodiments, an illustrative SNR minimum value that, if used for the purpose of bit allocation of data bits over a set of available frequency channels, would provide downlink and uplink data communication rates at a desired data rate and meeting the requirements for maximum BER. However, by setting the SNR value at the level illustrated by dashed line 203, the entire capacity of the number of bits that could be allocated to the available frequency channels may not be utilized, in other words would include excess and unused bandwidth, and the very minimum SNR that could be utilized to achieved this desired data rate and BER requirements would be the SNR that is utilized.

Embodiment as described throughout the disclosure include systems, apparatus and methods, and techniques that include an iterative process to determine if a higher and a thus more robust SNR could be utilized for the data communications, and if so, what higher value for an SNR might be available for use in a DMT data transmission format to achieve the desired data rate, meet the BER requirements for the data transmissions, while providing a higher value for the SNR. The higher value SNR may provide more robust data transmission, and lower the overall power requirements needed to perform the data transmissions. Arrow 204 and dashed line 205 represent a direction of movement for and a new proposed SNR value that is higher than the SNR value associated with SNR minimum and dashed line 203, wherein data communications performed using the new proposed SNR value represented by dashed line 205 may provide more robust data communications while still meeting the data rate and BER requirements for data communication between a surface modem and a modem configured to be included as part of a logging tool.

However, as further illustrated in FIG. 2B and as described below, raising the value for the SNR may reduce the overall number of data bits that may be included with a data burst being used to transmit the data communications, and at some level of the higher SNR value an adequate number of data bits per data bursts cannot be allocated to the frequency channels that remain available at the higher SNR value, and thus the required data rate for the data transmission can no longer be met. Embodiments of the systems, devices, method and techniques describe in the disclosure allow for determining if a SNR margin value that is higher than the SNR minimum value may be utilized to provide data communications between two or more modems while meeting the required data and BER rates.

Figure 2B:
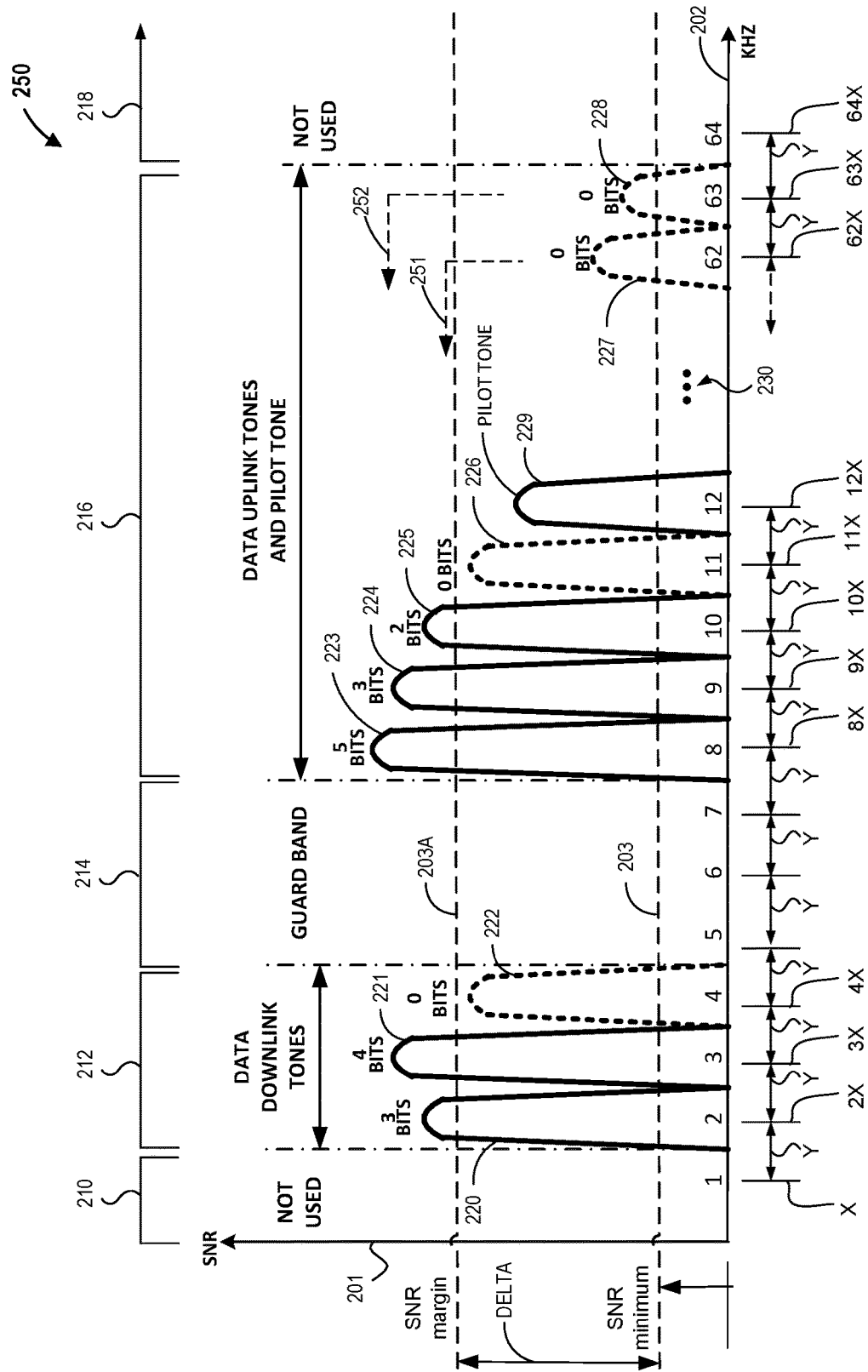
FIG. 2B illustrates a graph showing manipulation of frequency tones utilized in a discrete-multi-tone telemetry system according to various embodiments.

FIG. 2B illustrates a graph 250 showing manipulation of data bit allocations based on SNR margin values utilized in a discrete-multi-tone telemetry system according to various embodiments. Graph 250 includes many of the same features illustrated and described above with respect to FIG. 2A and graph 200, including a set of data downlink tones (tones 2 through 4) separated by a guard band (indicated by bracket 214) and a set of data uplink tones 8 through 12, 62, and 64). In graph 250 as shown in FIG. 2B, the horizontal dashed SNR margin line, now indicated by reference number 203A in FIG. 2B, is raised vertically relative to vertical axis 201 and above the level of the SNR minimum value illustrated by dashed line 203. This higher level for dashed line 203A may be implemented to provide an allocation of data bits to the available frequency channels while utilizing a higher SNR margin value, which in turn may provide more robust data communications between the surface modem and the modem(s) provided in a downhole tool.

However, one or more consequences of raising the SNR margin value to a value higher than the SNR minimum value may include that one or more frequency channels previously available for allocation of data bits may no longer be available for data bit allocations, and one or more of the frequency channels available may only be available for an allocation of a smaller number of bits than these channels could have been allocated using the SNR minimum value.

As illustrated in graph 250, at an SNR margin value illustrated by dashed line 203A, frequency channel 4 including in the data downlink tones and frequency channels 11, 62, and 63 of the data uplink tones do not provide a channel having an estimated SNR value that is above the higher SNR margin value indicated by dashed line 203A. As such frequency channels 4, 11, 62, and 63 are no longer frequency channels that are available for allocations of data bits, as illustratively represented by these tones being shown in graph 200 as dashed lines, and an indication of zero (0) bits being allocated to each of these same frequency channels. Any data bit allocations that may have previously been assigned to these channels when using the SNR minimum value must now be re-allocated, if possible, to some other frequency tone that is available and has capacity for these additional bits, for example as represented by dashed arrows 251 and 252 illustratively representing the relocation of data bit from frequency channels 62 and 63, respectively.

In addition, one or more of the frequency channels that remain available for data bit allocations using the higher SNR margin value represented by dashed line 203A may also have capacity for a smaller total number of bits that can be allocated to the frequency channel compared to the number of bits that could be allocated to these same frequency channels at the SNR minimum value. Due to the potential loss in the number of data bits that may be allocated to the available frequency channels at the higher SNR margin value, the due to the total number of bits that may be allocated across the available frequency channels, raising the SNR value to the higher value above the SNR minimum value may or may not continue to allow an allocation of an adequate number of data bits per data burst that still provides the required data rates using the SNR margin value.

Figure 2C:
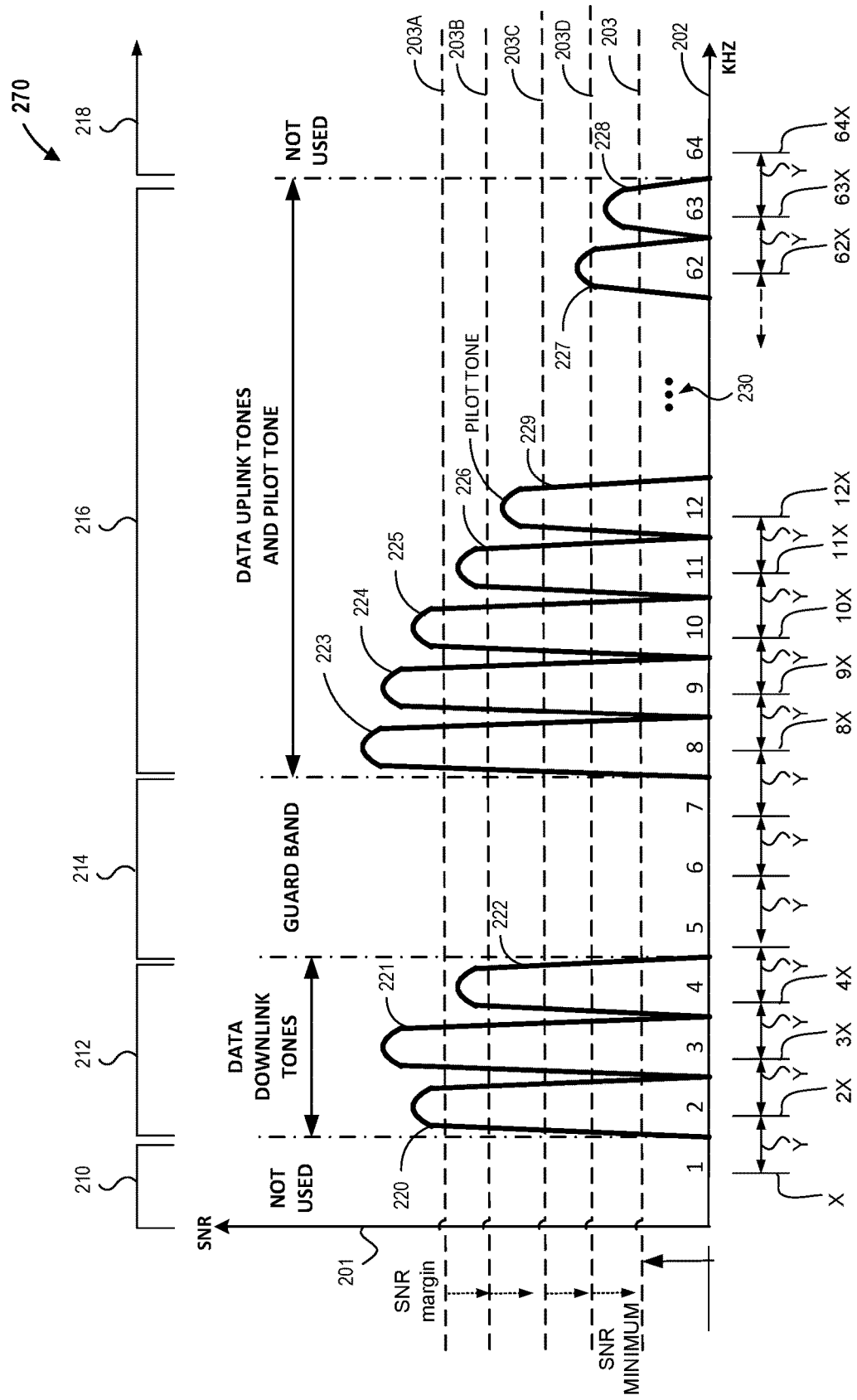
FIG. 2C illustrates a graph showing another manipulation of frequency tones utilized in a discrete-multi-tone telemetry system according to various embodiments.

FIG. 2C illustrates a graph 270 showing another manipulation of frequency tones utilized in a DMT data communications system according to various embodiments. Graph 270 includes many of the same features illustrated and described above with respect to FIG. 2A and graph 200, including a set of data downlink tones (tones 2 through 4) separated by a guard band (indicated by bracket 214) and a set of data uplink tones (tones 8 through 12, 62, and 64). In graph 270 as shown in FIG. 2C, a plurality of different proposed SNR margin values, illustratively represented in graph 270 by dashed lines 203A, 203B, 204C, and 203D, having values higher than a SNR minimum value represented by dashed line 203, may be tested to determine whether one of these higher proposed SNR margin values may be utilized for data communications between modems, such as surface modem 131 and tool modem 123, to provide data communications that meet the data rate and BER requirements.

In various embodiments, of a DMT telemetry system, the number of bits that can be carried at each tone for a desired maximum Bit Error Rate (BER) is given by:

$$b_i = \log_2\left(1 + \frac{10^{\frac{SNR_i}{10}}}{10^{\frac{\Gamma_{min}}{10}}}\right)$$ Equation (1)

wherein the $\Gamma_{min}$ is the SNR minimum value that should exist on a given data transmission to insure the desired BER performance can be obtained, for the data transmission, and wherein $SNR_i$ is the estimates of the SNR values of each of the $i_{th}$ tones. The total number of bits carried by the DMT system per DMT symbol is $$b_{total} = \Sigma_{i=1}^{N} b_i$$ Equation (2)

wherein $b_i$ is the number of bits allocated to the $i_{th}$ channel, and N is the total number of channels to which bits may be allocated.

Based on the $b_{total}$ total number of bits carried per DMT symbol, the training data rate (R) may be determined as follows:

$$R = \frac{b_{total}}{T_{symbol}}$$ Equation (3)

wherein $T_{symbol}$ is the total number of symbols to be transmitted per unit time.

Referring to FIG. 1 and system 100 in view of FIG. 2C and graph 270, when an operator loads the tools string service profile in the logging software, the required total telemetry data rate information for the tools string is available. This information can be sent from logging software to the surface modem via command. After the modem received this information, the modem will use the requested telemetry data rate as the target data rate and use an initially higher SNRs margin value, such as SNR margin value indicated by dashed line 203A, which is some level above the SNR minimum value, to start the modem training. The higher SNR margin values may provide increased robustness and may provide a lower BER compared to data transmissions that would be performed using the SNR minimum value. The setting of the initially higher SNR margin value, such as the SNR margin value illustratively indicated by dashed line 203A, is not limited to a particular value or a particular method of setting the value. In some embodiments, the initially higher SNR margin value may be set based on some predetermined value, for example but not limited to a value of 30 dB, added to the SNR minimum value. In various embodiments, the initially higher SNR margin value may be set based on a percentage, for example but not limited to some percentage, such as three-hundred percent of the SNR minimum value.

In various embodiments, at the beginning of the logging job, for example a logging job to log borehole 104 using system 100 and logging tool 120 (FIG. 1), an operator creates the tools string service profile using logging software. The software will determine the required uplink data rate $R_{up}$ and the required downlink data rate $R_{dn}$ for the loaded tools string. Software sends the required data rate information $R_{up}$ and $R_{dn}$ to the surface modem. The surface modem determines the required number of bits needed to be carried over one DMT symbol as $b_{target} = R \cdot T_{symbol}$. Modems start the training to estimate the SNRs over the transmission band for each of the frequency channels (tones) that are allocated for the uplink and the downlink data transmissions.

With the estimated SNRs information determined for each tone, the modems start the bit allocation iteration routine to utilizing the initially set value (dashed line 203A) for the SNR margin, to determine the number of bits that can be carried on each of the available frequency tones at the SNR margin value. As described above, in various embodiments the allocation for a given tone is based on the amount that the estimated SNR for that tone is above or higher than the proposed SNR margin value that is being used for that particular round of data bit allocations. The iteration routine initializes the targeted total number of bits to $b_{target}$ and SNR margin $\Gamma$ to $\Gamma_{max}$. For each frequency tone, the iteration routine determines the number of bits can be carried on this tone as:

$$b_i = \log_2\left(1 + \frac{10^{\frac{SNR_i}{10}}}{10^{\frac{\Gamma}{10}}}\right)$$ Equation (4)

wherein $SNR_i$ is the SNR for $i_{th}$ frequency tone, and F is the proposed SNR margin level being used to determine the bit allocation across all the tones (see e.g., SNR margin line 203A in graph 270).

After iterating over all the tones, a determination is made as to whether the total number of bits allocated to the frequency tones is greater than or equal to the target number of bits required for the data transmission. In instances where the total number of bits is greater than the target number of bits, that is, $b_{total} \geq t_{target}$, then the iteration process may stop, and communications may proceed using the bit allocation determined be last iteration process and the initially set value for the SNR margin. In various embodiments, if the initially set value for the SNR margin does provide for allocation of a total number of data bits to the available frequency channels meeting the data rate and BER requirements, another higher value for SNR margin may be set, and the bit allocation procedure repeated to see if an even higher SNR margin value may be used that would still allow a bit allocation over the available frequency channels while also meeting the requirements for data rate and BER.

Otherwise, in instances where the total number of bits that can be allocated using the initially set SNR margin value indicated by dashed line 203A is less than the target number of bits, that is, $b_{total} < t_{target}$, the iteration process may continue using a smaller proposed SNR margin value, which may be reduced by some predetermined value, and then repeating the bit allocation procedure using the incrementally lowered value for next proposed SNR margin. For example, the set value for a proposed SNR margin may be reduced from the level indicated by dashed line 203A to a smaller value indicated by dashed line 203B. The amount of the lowering of the SNR margin value between the level indicated by dashed line 203A and dashed line 203B is not limited to any particular amount, or any particular method for determining the amount. In some embodiments, the amount of the reduction of the SNR margin value between the level indicated by dashed line 203A and dashed line 203B is a predetermined value, such as a predetermined decibel value. In some embodiments, the amount of reduction in the value of SNR margin may be dependent on the difference between the initial SNR margin value (dashed line 203A) and the SNR minimum value (dashed line 203), such as a percentage of the difference between these two values.

Using the newly set SNR margin value indicated by dashed line 203B, the process of allocating data bits to the available frequency channels as described above is performed. As illustrated, in graph 270, by lowing the proposed SNR margin value from dashed line 203A to dashed line 203B, frequency channel 4, which was not available for data bit allocations when using the higher SNR margin value at dashed line 203A, now has an estimated SNR that exceeds the proposed SNR margin value for dashed line 203B. This same change also applies to channel 11. As such, channel 4 and/or channel 11 may now have the capacity to have data bits allocated to these channels. In addition, because of the greater different between the estimated SNR values for each of previously available channels 2, 3, 8, 9, and 10, these channels may be able to be allocated additional data bits compared to the data bit allocations available for these channels when using the higher SNR margin value indicated by dashed line 203A. Due to the lower of the proposed SNR margin level, the number of data bits that may be allocated over the now available frequency channels may have increased relative to the number of data bits that could be allocated over the available frequency channels when using the proposed SNR margin value indicated by dashed line 203A.

Once the allocation of the data bits over the available frequency channels using the newly set SNR margin value indicated by dashed line 203B has been completed, a determination is made as to whether the total number of bits allocated to the frequency tones is greater than or equal to the target number of bits required for the data transmission. In instances where the total number of bits allocated is greater than the target number of bits, that is, $b_{total} \geq t_{target}$, then the iteration process may stop, and communications may proceed using the bit allocation determined be last iteration process and the newly set value for the SNR margin indicated by dashed line 203B. In instances where the total number of bits that can be allocated using the newly set SNR margin level indicated by dashed line 203B, is less than the target number of bits, that is, $b_{total} < t_{target}$, the iteration process may continue using a smaller SNR margin value such as a proposed SNR margin value indicated by dashed line 203C, which may be reduced by some predetermined value, or by some other method, such as using a percentage value, relative to the previously tested proposed SNR margin value indicated by dashed line 203B.

Now using the newly set SNR margin value indicated by dashed line 203C, the process of allocating data bits to the available frequency channels based on the newly set proposed SNR margin value is performed. Once the data bit allocations over the available frequency channels using the newly proposed SNR margin value have been completed, a determination is made as to whether the total number of bits allocated to the frequency tones is greater than or equal to the target number of bits required for the data transmission suing the newly set SNR margin value. In instances where the total number of bits allocated using the newly set SNR a value that is greater than the target number of bits, that is, $b_{total} \geq t_{target}$, then the iteration process may stop, and communications may proceed using the bit allocation determined be last iteration process and the newly set value for the SNR margin indicated by dashed line 203C.

In instances where the total number of bits that can be allocated using the newly set SNR margin level indicated by dashed line 203C is less than the target number of bits, that is, $b_{total} < t_{target}$, the iteration process may continue using a smaller SNR margin value, such as a SNR margin value indicated by dashed line 203D. The process of bit allocation and making a determination of whether the number of data bits allocated at the newly proposed SNR margin level indicated by dashed line 203D is greater than or equal to the target rate and can be used for data communications, or if the number of allocated data bits is less than and cannot be used for the required data communications in a manner as described above with respect to the SNR margins values represented by dashed line 203B and 203C.

The process of allocating bits using the initial and newly set SNR margin values may continue until the utilized SNR margin allows for allocation of the required number of bits, that is, $b_{total} < t_{target}$, or the utilized SNR margin value reaches the minimum required SNR minimum value ($\Gamma_{min}$), and the required number of data bits still cannot be allocated over the available frequency channels. For example, each subsequent round of iterations as described above may include reducing the SNR margin by a predetermined amount, and then performing the next round of iterations. Using the newly reduced SNR margin value, a subsequent round of iterations is performed. Again, if the total number of bits is greater than the target number of bits, that is, $b_{total} \geq t_{target}$, then the iteration process may stop, and communications may proceed using the bit allocation determined be last iteration process and the SNR margin value that allowed the required number of data bits to be allocated over the available frequency cannels. Otherwise, in instances where the total number of bits is less than the target number of bits, that is, $b_{total} < t_{target}$, the iteration may continue using another new smaller SNR margin that is smaller in value than the SNR margin used in the previous round of iteration.

The process of iteration using a progressively smaller SNR margin values may continue until either the total number of bits is less than the target number of bits can be allocated using the latest SNR margin value, or the total number of bits that can be allocated when the proposed SNR margin value has been reduced to the minimum SNR minimum value and still will not accommodate the required total number of bits needed for the data transmission. The total number of iterations to be performed, and/or the amount of adjustments in the SNR margin values used for each subsequent round of bit allocations is not limited to any particular number of rounds of iterations and/or to any particular level of adjustments made to the SNR margin value between subsequent rounds, and may be determined in some embodiments by a predefined program, and/or by inputs, for example provided by an engineer or a technician providing input to the system.

In embodiments wherein the minimum required SNR margin still cannot meet the requirements for allocating at least the target number of data bits, $b_{total}$, an output may be generated that includes a warning message. The warning message may include a message directed to an operator, such as an engineer or a technician, to request the operator to put one or more tools included in the logging tool 120 into a particular mode, such as a silent mode. Placing one or more of the tools within the tool string in for example a silent mode may reduce the target number of data bits and the overall noise level that is occurring on the data transmission lines. The reduced target number of data bits and the noise level may allow the data transmission to occur while achieving the required level of bit rate error using the minimum SNR margin setting.

Embodiments of this method of determining if higher values for SNR margin by be used also utilizes the available tools string information to transform the extra available bandwidth that is used to transmit dummy data to improve the telemetry robustness and better noise immunity. Secondly, by lowering the number of bits sent on each tone, the peak to average power ratio of the transmitted telemetry signal is also lowered, which will reduce power consumption of downhole telemetry driver.

Benefits of these methods may provide improved telemetry robustness, better noise immunity and lower power consumptions for data transmissions between a surface modem and one or more modems included in a downhole tool. As described above, existing telemetry systems used fixed SNR margin $\Gamma_{min}$ during the training to determine the achievable data rate with the estimated SNRs. But in some cases, the achievable data rate is more than enough for the required data rate to perform the logging jobs. In these cases, the dummy data are sent to fill in the extra available bandwidth. Embodiments of the methods described in this disclosure utilize existing information, i.e. required data rate of the tools string, to transform the extra available bandwidth to improve the telemetry robustness and better noise immunity. Additional embodiments of the methods and variations of the techniques as disclosed herein are illustrated and described in further detail as follows.

For example, channels that are being utilized with the available bandwidth in a DMT scheme include channels ranging from a set of lower frequency bands to higher frequency bands. In various embodiments, the channels utilizing the higher frequency bands may be noisier compared to channels using the lower frequency bands. In view of this, embodiments of the systems, apparatus, and method described in this disclosure may include re-allocation of bits or the numb of bits being allocated from higher frequency channels to one or more frequency channels utilizing a lower frequency band. This re-allocation may allow for a same rate of data transmission using less overall power in providing the data communications, and/or allow a lowering of the overall bit rate error due to utilization of the less noisy channels to accomplish the data transmissions.

Figure 2D:
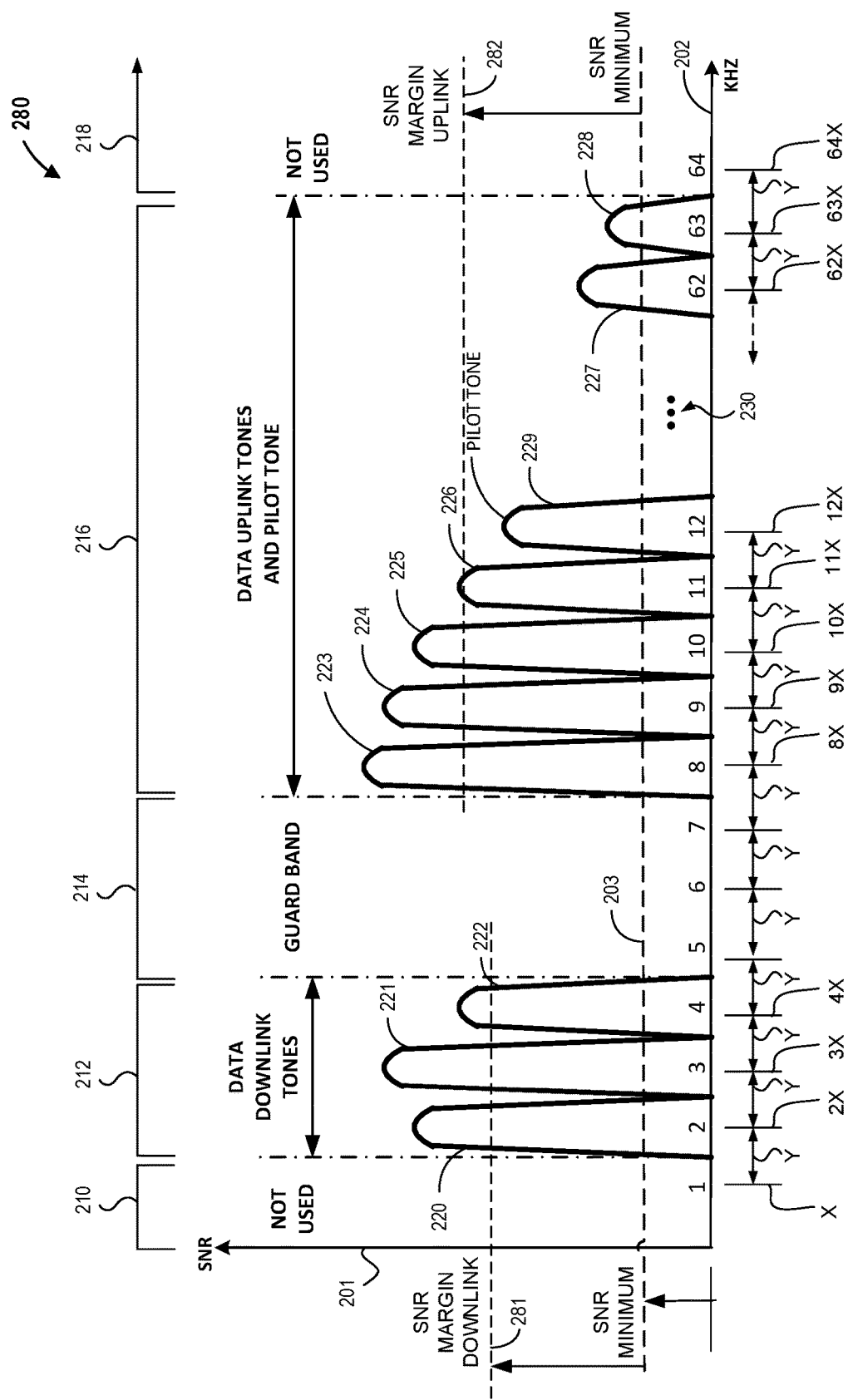
FIG. 2D illustrates a graph showing use of signal-to-noise margin values according to various embodiments.

FIG. 2D illustrates a graph 280 showing use of signal-to-noise margin values according to various embodiments. Graph 280 includes many of the same features illustrated and described above with respect to FIG. 2A and graph 200, including a set of data downlink tones (tones 2 through 4) separated by a guard band (indicated by bracket 214) and a set of data uplink tones (tones 8 through 12, 62, and 64). As illustrated in graph 280, the data downlink tones 2, 3, and 4 may have data bit allocations made to these frequency channels based on a first SNR margin value illustratively represented by dashed line 281. Data uplink tones 8, 9, 10, 11, 12, 62, and 63, along with any other tones available under bracket 216, may have data bit allocations made to these frequency channels based on a second SNR margin value illustratively represented by dashed line 282. The first SNR margin value assigned to the data downlink tones may be the same or have a different value compared to the second SNR margin value assigned to the data uplink tones. In various embodiments, any of the method and techniques described throughout the disclosure may be applied separately to the downlink data tones to determine an assigned SNR margin value for dashed line 281, and applied separately to the uplink data tones to determine and assign a value to the second SNR margin illustratively represented by dashed line 282. By applying separate procedures to determine the respective SNR margin values for the downlink and the uplink, data tones, a more optimal and more robust set of data bit allocations may be provided for the overall data communications format utilizing these assigned SNR margin values.

Figure 2E:
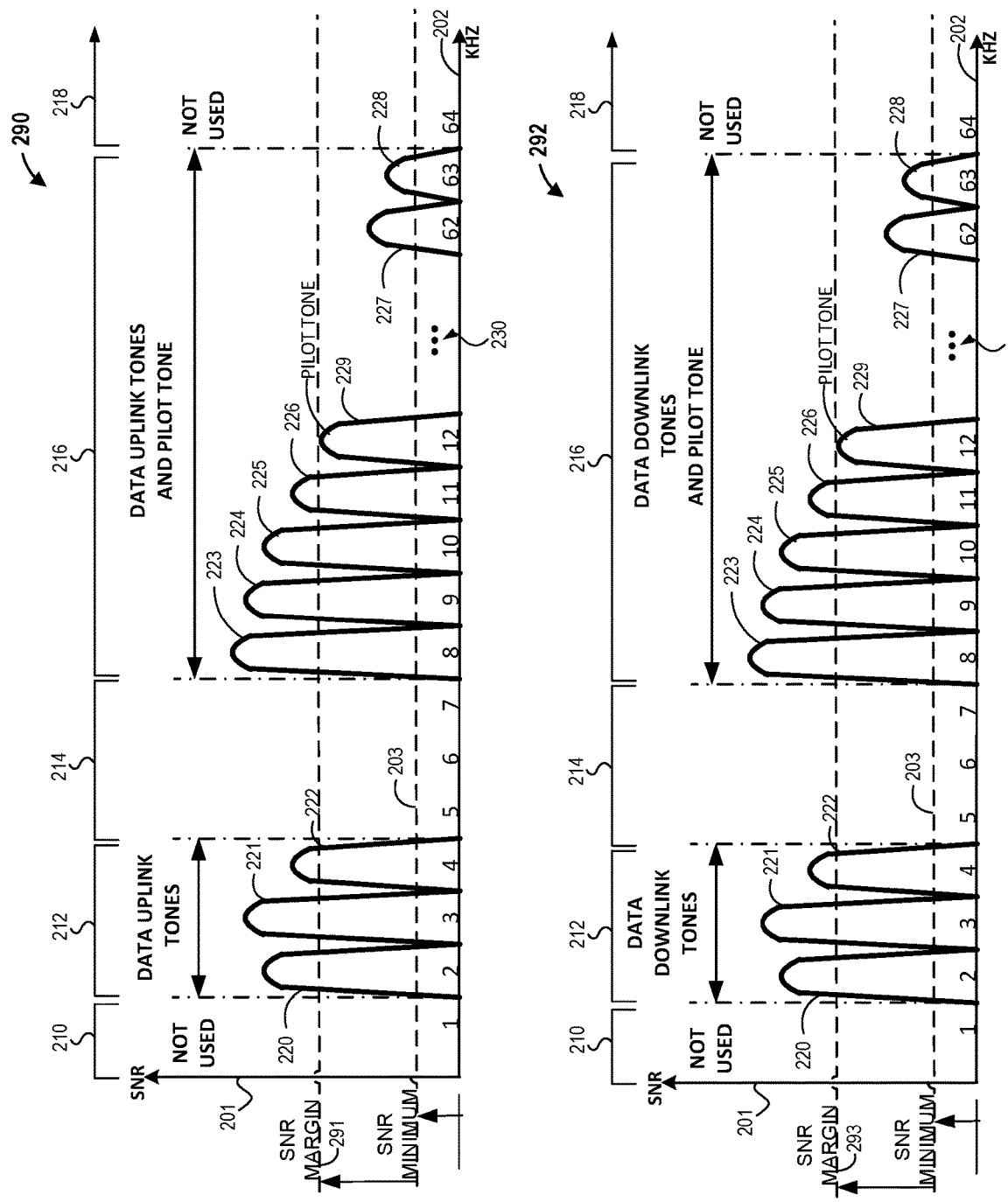
FIG. 2E illustrates a set of graphs showing use of signal-to-noise margin values in a multiplexed data communications format according to various embodiments.

FIG. 2E illustrates a set of graphs 290 and 292, showing use of signal-to-noise margin values in a multiplexed data communications format according to various embodiments. Graphs 290 and 292 include many of the same features illustrated and described above with respect to FIG. 2A and graph 200, including a set of data tones (tones 2 through 4) and a set of data tones (tones 8 through 12, 62, and 64). As illustrated in graph 290, all of the frequency channels included under both bracket 212 and bracket 216 are designated as "data uplink tones" and are configured for data bit allocations including data bits to be communicated as part of the uplink data communications. In various embodiments, because all of the tones in graph 290 are being used as "data uplink tones," a guard band separating the tones included under bracket 212 and 216 may not be required or utilized. In various embodiments, the frequencies falling between the frequencies indicated by bracket 212 and 216 may be used as additional tones having data bits assigned to these tones. Graph 290 further illustrates a SNR margin value, illustratively represented by dashed line 291, which may be utilized to determine the data bit allocations used to configure the frequency channels represented in graph 290 as part of an uplink data communications format. As illustrated in graph 292, all of the frequency channels included under both bracket 212 and bracket 216 are designated as "data downlink tones" and are configured for data bit allocations including data bits to be communicated as part of the downlink data communications. In various embodiments, because all of the tones in graph 292 are being used as "data downlink tones," a guard band separating the tones included under bracket 212 and 216 in graph 292 may not be required or utilized. In various embodiments, the frequencies falling between the frequencies indicated by bracket 212 and 216 in graph 292 may be used as additional tones having data bits assigned to these tones. Graph 292 further illustrates a SNR margin value, illustratively represented by dashed line 293, which may be utilized to determine the data bit allocations used to configure the frequency channels represented in graph 290 as part of a downlink data communications format.

In various embodiment, the data formatting illustrated in graph 290 may be provided as a first data burst, and multiplexed with the data formatting illustrated in graph 292 as a second data burst transmitted as a different time from a time when the first data burst is transmitted. The SNR margin value represented in graph 290 as dashed line 291 may be set using any of the methods and techniques described herein and any equivalent thereof, and may be a different value set for the SNR margin value represented in graph 292 as dashed line 293, which may also be determined using any of the methods and techniques described herein, and any equivalents thereof. In various embodiments, multiplexed data transmissions based on a configuration of the frequency channels such as but not limited to the frequency channels illustrated in graphs 290 and 292, respectively, may allow for more robust data transmission by utilizing a higher and optimal or near optimal SNR margin value for each of these respective uplink and downlink data transmissions. By applying only uplink or downlink data bit allocation to each of these respective data burst configurations, a data format that is able to utilize a higher SNR margin value may be achievable comparted to a data configuration that utilizes both uplink and downlink bit allocation on a same data burst.

Figure 3:
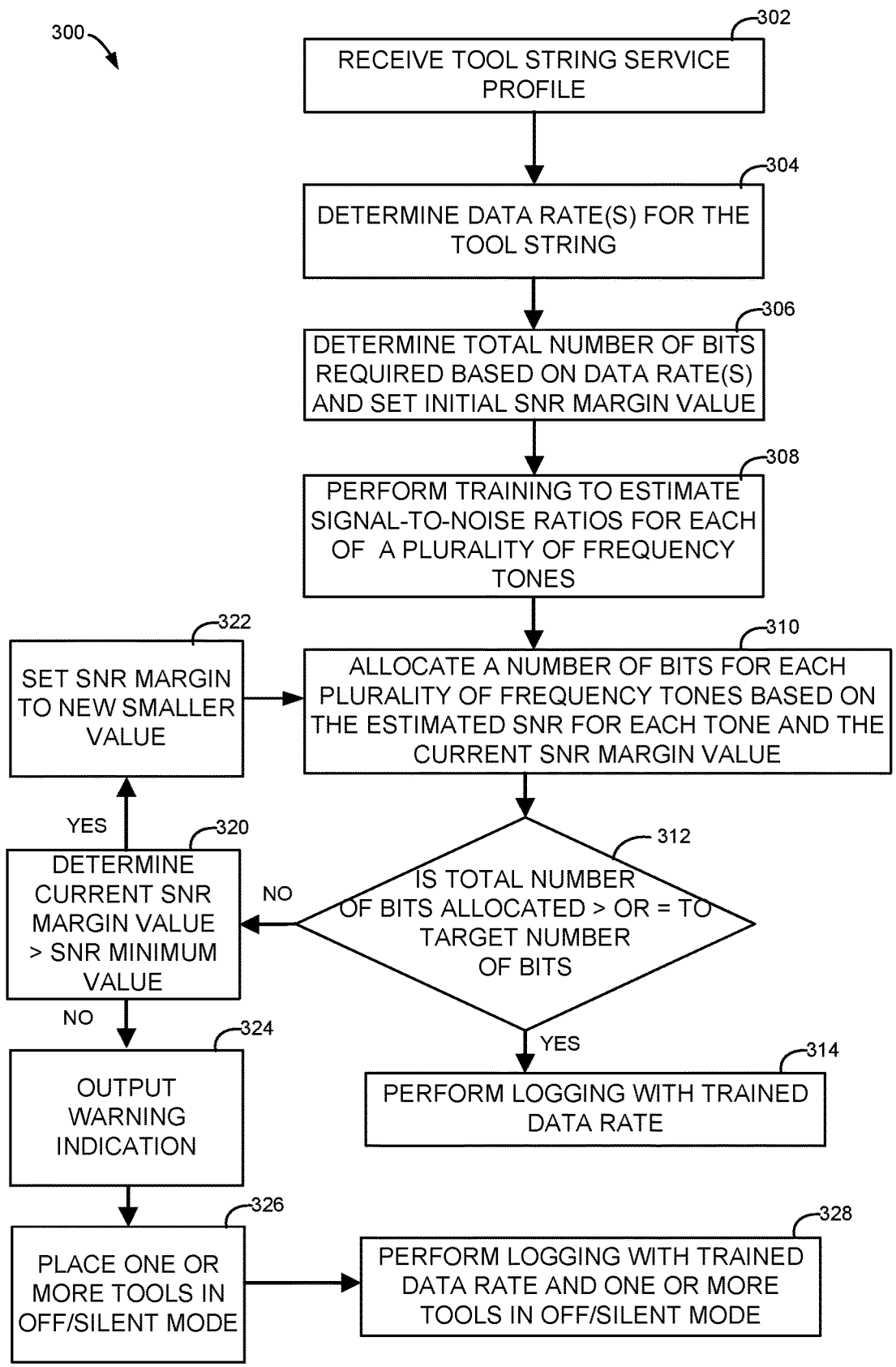
FIG. 3 illustrates a flowchart of a method according to various embodiments.

FIG. 3 illustrates a flowchart of a method 300 according to various embodiments. The flowchart is provided as an aid to understanding the illustrations, and is not to be used to limit scope of the claims. The flowchart depicts example operations that may vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, may be implemented by program code. The program code may be provided to one or more processors of a modem, a general purpose computer, a special purpose computer, or other programmable machines or apparatus.

In the description below, various operations included in method 300 are described as being performed by one or more processors (hereinafter "the processor") that may be included as part of surface modem 131 as shown in FIG. 1. However, embodiments of method 300 are not limited to having the various operations and method steps being performed by the processor included as part of surface modem 131. Portions of or all of the operations and methods steps may be performed in part or wholly by other processors, such as but not limited to processors located in modems included in a logging tool, such as processors located in tool modems 123 and/or additional modems, such as modem 128 as illustrated and described with respect to FIG. 1. In various embodiments, portions of or all of the operations and methods steps included in method 300 may be performed in part or wholly by other processors, such as but not limited to processors located in a computer system coupled to modem 131, such as computer system 135 as illustrated and described with respect to FIG. 1.

Method 300 includes the processor receiving a tool string service profile (block 302). The tool string service profile may include a variety of information including the type and number of sensors included in the logging tool, the types and parameters associated with one or more power supplies included in the logging tool to power the sensors and tools, and to power telemetry communications to and from the logging tool. In some embodiments, the tool string service profile is based on the configuration and operating parameters of an actual tool string that is being prepared for a logging operation in a borehole. In other embodiments, the tool string service profile is based on a proposed configuration for a tool string that is being considered and reviewed for possible use in a logging operation.

Based on the received tool string service profile, method 300 includes the processor determining one or more data rates for the tool string (block 304). In various embodiments, determining the one or more data rates includes determining a required uplink data rate for communications originating from the logging tool that are to be transmitted to a surface modem through a wired communication link, and determining a required downlink data rate for communications originating from the surface modem through the wired communication link to the logging tool. In various embodiments, the data rate or data rates are included in the data provided with the tool string service profile. The data provided by the tool string service profile may include a value for a maximum BER that needs to be conformed to when the telecommunications are being provided at the target data rate.

Based on the determined one or more data rates, method 300 includes the processor determining a target total number of bits, b_target, and sets a value for an initial SNR margin (block 306). The initial value set for the SNR margin is a value that is greater than a minimum SNR, referred to as SNR minimum. The SNR minimum value represents a minimum SNR that can be tolerated while still guaranteeing an acceptable BER during the telemetry data transmission to be performed between modems as part of a logging procedure. For example, if a SNR minimum value of 18 dB has been determined for the value for an acceptable maximum BER, the initial SNR margin value may be set to 30 dB.

Method 300 includes the processor beginning training to estimate the individual SNRs over the transmission band for each of the frequency channels that are available for allocation of data bits (block 308). The estimated SNR for each individual frequency channel may be different from the estimated SNR for other frequency channels that are considered available channels for data communication. In various embodiments, the estimated SNR for an individual frequency channel may be determined as follows. Assuming that the data communications using the frequency channels is to occur between a surface modem and a downhole modem, the process begins by sending a known training signal, for example including data representing a known DMT symbol, between surface modem and downhole modem. When the downhole modem receives the known training signal S_r, it is equal to S_r=S_t+Noise, wherein S_t is the known training signal and "Noise" is the signal strength of any noise signals received with the known training signal. The Noise can be estimated by Noise_estimate=S_r−S_t, and then the SNR can be determined by the formula SNR=10*log 10(S_t^2/Noise_estimate^2). SNR is the signal power to noise power ratio for the frequency channel used to transmit the known training signal. This process may be repeated for each of the available frequency channels, and thereby establishing an estimated SNR for each individual frequency channel A similar process may be repeated for uplink data communications, wherein the known training signal is transmitted from the downhole modem to the surface modem, and the SNR for each of the frequency channels intended for uplink communications may be estimated.

Using the estimated SNRS for each individual frequency channels, method 300 includes the processor allocating the number of bits that can be allocated for data transmission on each tone (available frequency channels) based on the estimated SNR determined for that tone and the current value set for the SNR margin, (block 310). For the first round of determining bit allocations, the current value for the SNR margin would be the initial value set for the SNR margin. For any tones having an estimated SNR value that is below the current SNR margin value, these tones are indicated as being "unavailable" for bits to be allocated to that tone. For any tones have an estimated SNR value greater than the current SNR margin value, a determination is made as to how many bits may be allocated to that tone. In various embodiments, the number of bits that may be allocated to a particular tone is determined by the different in the values for the estimated SNR for a that particular tone and the current value of the SNR margin. In various embodiments, Equation 4 as provided above may be used to determine the number of bits that may be allocated to a particular frequency channel.

In some embodiments, a difference value per bit may determine the overall number of bits that may be allocated to that tone. By way of example, a current value for the SNR margin may have a value of 30 dB, and an estimated SNR for a particular frequency channel may be 39 dB. Using a difference value of 1 bit per every 3 dB difference in value between the SNR margin and the estimated SNR for the particular frequency channel, that frequency channel may be allocated to have three data bits based on the 9 dB difference between the 39 dB value for the estimated SNR and the 30 dB value currently assigned to the SNR margin. Because each frequency channel available for bit allocations may have a different estimated SNR value, the number of bits allocated to each frequency channel may vary based on the difference between the estimated SNR for each channel and the current value set for the SNR margin.

After the allocation of the total number of bits that can be carried on each available tone based on the current SNR margin value for the respective tones is completed, method 300 includes determining whether the total number of bits allocated over the available frequency tones is greater than or equal to the target total number of bits b_target (block 312). If the total number of bits allocated over the tones included in the communication bandwidth is greater than or equal to b_target ("YES" arrow extending from block 312), that indicates that the required number of bits to be transmitted can be allocated over the available tones at the designated SNR margin for each tone and still meet the required bit error rate. In such cases, method 300 may proceed to set the data rates for any logging operations with the rate trained data rate (block 314). Any logging operations then performed may include telemetry communication between the logging tool and a surface modem using the set data rates between the modems and the bit allocated determined for the latest SNR margin valued used to allocate the bits.

In the alternative, if the total number of bits allocated over the tones included in the communication bandwidth at block 312 is not greater than or equal to b_target ("NO" arrow extending from block 312), that indicates that the required number of bits to be transmitted cannot be allocated over the available tones at the designated SNR margin for each tone and still meet the required bit error rate. In such cases, method 300 proceeds to block 320.

At block 320, method 300 includes the processor determining whether the current value for the SNR margin can be lowered without going below the SNR minimum value. In other words, a determination is made as to whether the current value for the SNR margin $\Gamma$ is greater than the predetermined value for SNR minimum $\Gamma_{min}$. If the current value for SNR margin is greater than $\Gamma_{min}$ ("YES" arrow extending from block 316), method 300 progresses to block 322. At block 322, the processor determines a new value for SNR margin. The new value for the SNR margin may be determined by lowering the current and previously tested SNR margin value by a predetermined amount. For example, if the current SNR margin is set to a value of 18 dB, the process may lower this value by a fixed amount, such as 0.5 to reduce the SNR margin to 17.5 db. The amount that the current SNR margin value is reduced by is not fixed to any particular value, and may be a non-zero value greater than, equal to, or less than 1.

In some embodiments, the amount that the SNR margin is reduced by is not based on a fixed or predetermined amount, but may instead be determined based on some other technique. For example, the amount of reduction of the SNR margin value that is to be applied to the current value for the SNR margin may be based on the relative different between the current SNR margin and the SNR minimum value $\Gamma_{min}$. For example, the SNR adjustment made at block 322 may include setting the new SNR margin value to some percentage value of the different between the current SNR margin value and the SNR minimum value $\Gamma_{min}$ value. For example, the amount of adjustment made to the current SNR value to set the new SNR margin value may be set to fifty percent of the difference between the current SNR value and the $\Gamma_{min}$ value.

Using this technique, the first time block 322 is executed as part of method 300, the amount of adjustment made the SNR margin value may be larger than any of the subsequent adjustments to the SNR margin value, and thus the series of adjustments to the SNR margin values may be arranged to proceed using a series of non-linear or non-equal level adjustments relative to prior and/or for subsequent SNR margin value adjustments. In various embodiments, any adjustment to the current SNR margin value that would reduce the SNR margin value below the $\Gamma_{min}$ value will not be allowed, and SNR margin values may be set to $\Gamma_{min}$ in such instances before proceeding with the next step of method 300. Once a determination has been made at block 320 that a new lower current value for SNR margin value can be made, method 300 may proceed to block 322, wherein the processor sets the SNR margin value to the new smaller SNR margin value, and proceeds back to block 310.

At block 310, the processor again initiates the process used to determine the number of bits that can be allocated to each available tone based on the estimated SNR determined for that tone and the current setting for the SNR margin value. Once the total number of bits have been allocated using the newly assigned SNR margin value, method 300 proceeds to block 312, wherein the processor determines if the total number of allocated bits allocated by the latest allocation process using the current SNR margin value is greater than or equal to b_target. If the total number of bits allocated in the latest round of bit allocations is greater than or equal to b_target, method 300 may proceed to block 314, including setting data rates at the latest used values for SNR margin.

Returning to block 312, if the processor determines that the total number of bits allocated in the latest assigned value for SNR margin is not greater than or equal to b_target, the method may again return to block 320, to determine if the current SNR is greater than SNR min, and to proceed with another adjustment the SNR margin value if such an adjustment can be made without lowering the SNR margin to a value below $\Gamma_{min}$. This cycle of allocating bits based on a current value of SNR margin, determining if the total number of allocated bits is greater than or equal to b_target, and if not, adjusting the value SNR margin to some lower value if such an adjustment can be made relative to the SNR minimum value may be repeated any number of times until either the total number of allocated bits at the current SNR margin value is greater than or equal to b_target, or the SNR margin value has reached the SNR minimum value $\Gamma_{min}$, and the total number of bit that can be allocated using the $\Gamma_{min}$ SNR margin value is still not greater than or equal to b_target.

When the total number of bits that can be allocated using a SNR margin value that is equal to the SNR minimum value $\Gamma_{min}$ is still not equal to or greater than b_target, method 300 may proceed from block 320 to block 324. At block 324, the processor in method 300 issues a warning output. The warning output may include an indication that the total number of bits that may be allocated to the available frequency channels using the SNR minimum value will not accommodate the b_target required number of bits. In various embodiments, the warning output may include information related to this situation, such as a total number of bits allocated using the latest SNR margin value, the $\Gamma_{min}$, value, a listing of the estimated SNR values for each of the frequency channels, and/or the latest setting for the data training rates. The warning may for example be provided as an output that may be visible to an operator, for example as a message provided on a display of a computer system such as computer system 135 (FIG. 1).

In various embodiments of method 300, following issuance of a warning indication at block 324, the processor may provide output instructions that place one or more tools or other instruments included in the logging tool into an OFF mode, or into a silent mode of some type. When in the off or silent mode, the particular logging tool in that state may not be transmitting or receiving data as part of the logging operation, and thus does not contribute to the data bit load associated with the data transmissions between the logging tool and the surface modem, and/or does not contribute to noise that may be generated in instances where the deice or devices now in the off or silent mode were instead operational. In various embodiments, the decision as to which tool or tools are to be placed in the off or silent mode may be based on information already stored in a memory coupled to the processor, and may occur automatically upon generation of the output warning indication. In various embodiments, the decision as to which tool or tools are to be placed in the off or silent mode may be based, in part or in whole, on inputs provided by an operation and received by the processor.

In various embodiments, once one or more of the logging tools are place in the off or silent mode, method 300 may proceed to block 328, wherein the logging operation is performed using the last trained data rate and with the one or more tools remaining in the off or silent mode. In various embodiments, adjustments to the tools turned off or placed in silent mode may be considered as re-creating a new tool string service profile from the originally downloaded tool string service profile. In such embodiments, the new tool string service profile may be received, as described above for block 302, wherein method 300 proceeds as described above to perform the steps and operations to determine a new set of bit allocations and a new value for a SNR margin that may be usable for telemetry data communication between a surface modem and a downhole modem based on the new tool string service profile.

Variations to the operations described above with respect to method 300 are possible and are contemplated for use in setting up the data communications between a surface modem, such as surface modem 131, and one or more tool modems, such as tool modem 123. In some embodiments, if the initial first round of bit allocations performed with the initially set value for the SNR margin results in the total number of bits allocated to the available frequency channels being equal to or greater than b_target, method 300 may include raising the value of SNR margin to one or more larger values, and performing the bit allocation process using each of these one or more larger values to determine if an even larger value for SNR margin compared to the initially set SNR margin value could result in a bit allocation that would allow a number of bits equal to or greater than b_target to be allocated over the available frequency channels. If such a larger SNR margin value would still provide a bit allocation including a numb of bits greater than or equal to b_target, logging operations may proceed as described at block 314, but using the higher SNR margin value.

In various embodiments, in the process of testing a progressively smaller SNR margin value as described above, if a given SNR margin value results in a bit allocation having a number of bits allocated over the available frequency channels that is greater than b_target, embodiments of method 300 may include raising the SNR margin value upward to a larger margin value that is between the last SNR margin value tested and the previously used SNR margin value that did not allow for a number of bits to be allocated over the available frequency channels that was greater than or equal to b_target. If this raised SNR margin value results in a bit allocation that includes a number of bit allocated equal to b_target, logging operations (block 314) may proceed using the raised SNR margin value. If this raised SNR margin value results in a bit allocation that included a number of bis allocated that is greater than b_target, method 300 may include again raising the value of SNR margin to a new and larger SNR margin value, and again determining if the number of bits that may be allocated using the new and larger SNR margin value is equal to or greater than b_target. By raising the SNR margin value and testing the bit allocations at one or more of the raised SNR margin values, method 300 may determine a SNR margin value that optimizes the signal strength of the data commutations while still meeting the data rate and BER requirements. In doing so, method 300 may determine an optimal or near optimal SNR margin value, and thus a more robust DMT data communications format for use in a system, such as but not limited to system 100 of FIG. 1.

In various embodiments of method 300, the process of determining a SNR margin value that may be used for DMT data communications may include separately determining a SNR margin value for the uplink data communications and for the downlink data communications. For example, the process described above and any variations thereof may be performed for a set of frequency channels designated for the uplink data communications to determine a SNR margin value that may be applied to bit allocations utilized for the uplink data communication, and performed separately on a different set of frequency channels designated for the downlink data communications. These separate processes may result in assigning a first SNR margin value for the uplink data communications that is the same or that is different from a second SNR margin value assigned for the downlink data communications. In various embodiments, wherein one or more same frequency channels are utilized in a multiplexed data burst arrangement to provide both uplink and downlink data communication, method 300 may be utilized to determine separately SNR margin values, which may be the same or different SNR margin values, for use during each of the individual multiplexed data bursts.

Figure 4:
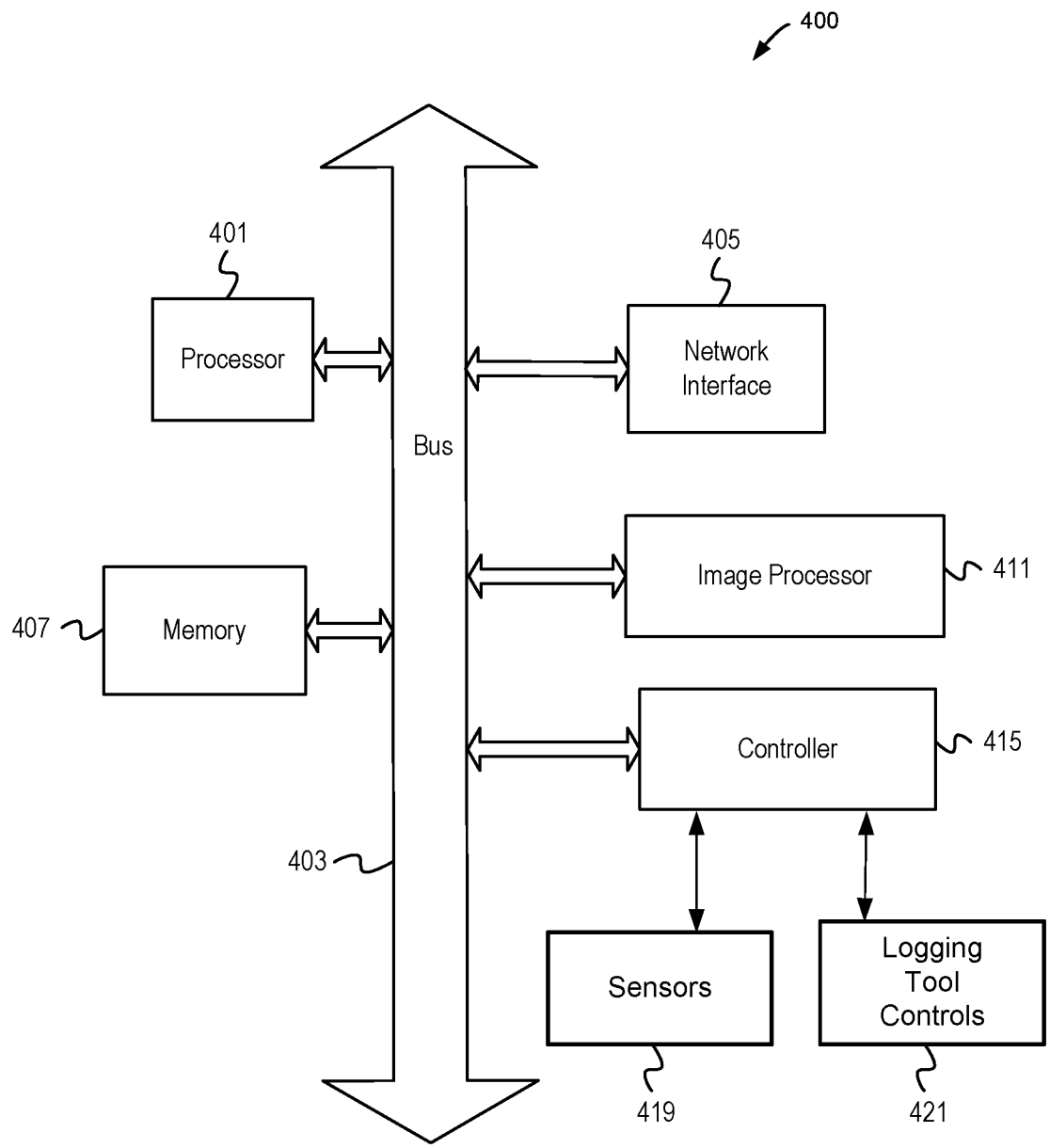
FIG. 4 illustrates a block diagram of a computer system according to various embodiments.

FIG. 4 illustrates a block diagram of an example computing system 400 that may be employed to practice the concepts, methods, and techniques disclosed herein, and variations thereof. The computing system 400 includes a plurality of components of the system that are in electrical communication with each other, in some examples using a bus 403. The computing system 400 may include any suitable computer, controller, or data processing apparatus capable of being programmed to carry out the method and apparatus as further described herein. In various examples, one or more components illustrated and described with respect to computing system 400 may be included in or as a component of modem 131, and/or any of modems 123 to 128 as illustrated and described with respect to FIG. 1, and may include any of the features and/or perform any of the function described with respect to these modems, including any of the methods and techniques described throughout this disclosure, and any equivalents thereof.

Referring back to FIG. 4, computer system 400 may be a general-purpose computer, or a computing device packaged to withstand the downhole environment, including temperature sand shock stresses that may be encountered in a borehole. In various embodiments, computer system 400 includes a processor 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the possible realizations of machine-readable media. The computer system also includes the bus 403 (e.g., PCI, ISA, PCI-Express, HyperTransport® bus, InfiniBand® bus, NuBus, etc.) and a network interface 405 (e.g., a Fiber Channel interface, an Ethernet interface, an internet small computer system interface, SONET interface, wireless interface, etc.).

The computer may also include an image processor 411 and a controller 415. The controller 415 may control the different operations that can occur in the response inputs from sensors 419 and/or calculations based on inputs from sensors 419 (such as sensors included in logging tool 120, FIG. 1) using any of the techniques described herein, and any equivalents thereof. For example, the controller 415 can receive and/or process signal received from one or more sensors 419 included in logging too. In various embodiments, controller 415, based on instructions from processor 401, may control one or more logging tools, for example to place one or more of the logging tools into an off mode or a silent mode.

Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). As illustrated in FIG. 4, the processor 401 and the network interface 405 are coupled to the bus 403. Although illustrated as also being coupled to the bus 403, the memory 407 may be coupled to the processor 401 only, or both processor 401 and bus 403.

Controller 415 may be coupled to sensors 419 and to logging tools controls 421 using any type of wired or wireless connection(s), and may receive data, such as measurement data, obtained by sensors 419 Sensors 419 may include any of the sensors associated with a wellbore environment, including sensors and logging tools such as a High-Fidelity Borehole Imager configured provide information related to micro-resistivity associated with the borehole environment. Controller 415 may include circuitry, such as analog-to-digital (A/D) converters and buffers that allow controller 415 to receive electrical signals directly from one or more of sensors 419.

Processor 401 may be configured to perform one or more of the data telemetry communication functions as described throughout this disclosure, and any equivalents thereof. For example, processor 401 may be configured to perform program steps that when perform, provide any of the features described above with respect to configuring data communications between a logging tool and a surface modem. In addition, processor 401 may be configured to control network interface in order to provide data communications to and/or from computing system 400 using any of the methods and techniques for configuring the data transmissions as described throughout this disclosure, and any equivalents thereof.

With respect to computing system 400, basic features may easily be substituted for improved hardware or firmware arrangements as they are developed. In some examples, memory 407 includes non-volatile memory and can be a hard disk or other types of computer readable media which can store data that are accessible by a computer, such as magnetic cassettes, flash memory cards, solid state memory devices, digital versatile disks (DVDs), cartridges, RAM, ROM, a cable containing a bit stream, and hybrids thereof.

It will be understood that one or more blocks of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus. As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine. While depicted as a computing system 400 or as a general purpose computer, some embodiments can be any type of device or apparatus to perform operations described herein.

Aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium, may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. Plural instances may be provided for components, operations or structures described herein as a single instance. For example, reference to "a processor" in the disclosure and in the claims is not limited to use of a single processor along, and may include a plurality of processors operating in some manner to perform the function(s) and features ascribed to the processor. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed. As used herein, the term "or" is inclusive unless otherwise explicitly noted. Thus, the phrase "at least one of A, B, or C" is satisfied by any element from the set {A, B, C} or any combination thereof, including multiples of any element.

Embodiments of the systems, apparatus, methods, and techniques as described herein may include the following embodiments.

Embodiment 1. A method comprising: determining, by a modem, a total number of bits b_total required to be allocated over a set of available frequency channels configured as a discrete multi-tone (DMT) data communications format to enable telemetry communications between the modem and a logging tool while meeting requirements for a minimum total telemetry data rate and a maximum bit-error-rate (BER) for the telemetry communications; setting, by the modem, one or more proposed signal-to-noise (SNR) margin values, each of the one or more proposed SNR margin values greater than a SNR minimum value, wherein the SNR minimum value is a minimum SNR value that may be untiled in the DMT data communications format while meeting the requirements for the minimum total telemetry data rate the maximum bit-error-rate (BER); and for each of the one or more proposed SNR margin values, performing, by the modem, a bit allocation procedure to determine a number of bits that are allocatable over the set of available frequency channels based a current setting for the proposed SNR margin values, and determining, by the modem, whether the number of bits allocatable over the set of available frequency channels using the current setting for the proposed SNR margin value is greater than or equal to the total number of bits b_total.

Embodiment 2. The method of embodiment 1, wherein determining whether the number of bits allocatable is greater than or equal to the total number of bits b_total further includes determining that the number of bits allocatable based on the current setting for the proposed SNR margin value is greater than or equal to the total number of bits b_total, and formatting the telemetry communications to be performed as part of a logging operation of a wellbore including providing communication signals between the modem and the logging tool using the bit allocations and the set of available frequency channels determined to provide the number of bits greater than or equal to the total number of bits b_total based on the current setting for the proposed SNR margin. Embodiment 3. The method of embodiments 1 or 2, wherein determining whether the number of bits allocatable is greater than or equal to the total number of bits b_total further includes determining that the number of bits allocatable based on the current setting for the proposed SNR margin value is less than the total number of bits b_total, iteratively lowering a current setting for the proposed SNR margin value to one or more newly proposed SNR margin values, each of the one or more newly proposed SNR margin values less than the current setting for the proposed SNR margin and greater than the SNR minimum value, and for each of the iteratively lowered current setting for the proposed SNR margin values, performing, by the modem, a bit allocation procedure to determine a number of bits that are allocatable over the set of available frequency channels based iteratively lower current setting for the proposed SNR margin values, and determining, by modem, whether the number of bits allocatable over the set of available frequency channels using the iteratively lowered current setting for the proposed SNR margin value is greater than or equal to the total number of bits b_total.

Embodiment 4. The method of embodiment 3, wherein iteratively lowering the current setting for the proposed SNR margin value to a next one of the one or more newly proposed SNR margin values comprises lowering the current setting for the proposed SNR margin value by a predetermined amount to set the next one of the one or more newly proposed SNR margin values. Embodiment 5. The method of embodiment 3, wherein iteratively lowering the current setting for the proposed SNR margin value to a next one of the one or more newly proposed SNR margin values comprises lowering the current setting for the proposed SNR margin value by an amount equal to a percentage of a difference between the current setting for the SNR margin value and the SNR minimum value.

Embodiment 6. The method of any of embodiments 1 to 5, further comprising: determining that none of the proposed SNR margin values greater than the SNR minimum value provides a telemetry communications format that includes the number of bits allocatable over the set of available frequency channels that is greater than or equal to the total number of bits b_total, and outputting, by the modem, a warning message including an indication that the total number of bits that may be allocated to the available frequency channels using any of the proposed SNR margin values can accommodate the total number of bits b_total required number of bits being allocated over the available set of frequency channels while still meeting the requirements for the minimum total telemetry data rate and the maximum (BER). Embodiment 7. The method of any of embodiments 1 to 6, further comprising: determining that none of the one or more proposed signal-to-noise (SNR) margin values having value greater than the SNR minimum value provides a telemetry communications format that includes the number of bits allocatable over the set of available frequency channels that is greater than or equal to the total number of bits b_total; automatically placing into a silent mode one or more devices included in the logging tool; and formatting the telemetry communications to be performed as part of a logging operation of a wellbore including providing communication signals between the modem and the one or more devices of the logging tool that are not placed into the silent more. Embodiment 8. The method of any of embodiments 1 to 7, further comprising; receiving, at the modem, an input indicating that one or more of the set of frequency channels are to be designated as unavailable, and that performing the bit allocation procedure to determine a number of bits that are allocatable over the set of available frequency channels comprises not allocating bits to the frequency channels designated as being unavailable. Embodiment 9, The method of any of embodiments 1 to 8, further comprising, receiving, by the modem, a tool string service profile including a data rate value for the minimum total telemetry data rate, and a BER value for the maximum bit-error-rate (BER) for the telemetry communications to be provided between the modem and the logging tool.

Embodiment 10. A system comprising; a downhole logging tool comprising one or more sensors configured to perform sensing in a downhole environment of a borehole; a surface modem configured to communicatively coupled to the logging tool, the surface modem comprising one or more processors configured to set up and perform data communications between the downhole tool and the surface modem while the logging tool is performing a logging operation of the borehole; the one or more processor configured to: determine a total number of bits b_total required to be allocated over a set of available frequency channels configured as a discrete multi-tone (DMT) communications format to enable telemetry communications between the modem and a logging tool while meeting requirements for a minimum total telemetry data rate and a maximum bit-error-rate (BER) for the telemetry communications; set one or more proposed signal-to-noise (SNR) margin values, each of the one or more proposed SNR margin values greater than a SNR minimum value, wherein the SNR minimum value is a minimum SNR value that may be untiled in the DMT data communications format while meeting the requirements for the minimum total telemetry data rate the maximum bit-error-rate (BER); and for each of the one or more proposed SNR margin values, perform a bit allocation procedure to determine a number of bits that are allocatable over the set of available frequency channels based a current setting for the proposed SNR margin values, and determining, by modem, whether the number of bits allocatable over the set of available frequency channels using the current setting for the proposed SNR margin value is greater than or equal to the total number of bits b_total.

Embodiment 11. The system of embodiment 10, wherein determining whether the number of bits allocatable is greater than or equal to the total number of bits b_total further includes the one or more processors configured to: determine that the number of bits allocatable based on the current setting for the proposed SNR margin value is greater than or equal to the total number of bits b_total, and format the telemetry communications to be performed as part of a logging operation of a wellbore including providing communication signals between the modem and the logging tool using the bit allocations and the set of available frequency channels determined to provide the number of bits greater than or equal to the total number of bits b_total based on the current setting for the proposed SNR margin. Embodiment 12. The system of embodiment 10, wherein determining whether the number of bits allocatable is greater than or equal to the total number of bits b_total further includes the one or more processors further configured to: determine that the number of bits allocatable based on the current setting for the proposed SNR margin value is less than the total number of bits b_total, iteratively lowering the current setting for the proposed SNR margin value to one or more newly proposed SNR margin values, each of the one or more newly proposed SNR margin values less than the current setting for the proposed SNR margin and greater than the SNR minimum value, and for each of the iteratively lower current setting for the proposed SNR margin values, perform a bit allocation procedure to determine a number of bits that are allocatable over the set of available frequency channels based iteratively lower current setting for the proposed SNR margin values, and determining, by modem, whether the number of bits allocatable over the set of available frequency channels using the iteratively lowered current setting for the proposed SNR margin value is greater than or equal to the total number of bits b_total. Embodiment 13. The system of embodiment 12, wherein iteratively lowering the current setting for the proposed SNR margin value to a next one of the one or more newly proposed SNR margin values comprises lowering the current setting for the proposed SNR margin value by a predetermined amount to set the next one of the one or more newly proposed SNR margin values. Embodiment 14. The system of embodiment 12, wherein iteratively lowering the current setting for the proposed SNR margin value to a next one of the one or more newly proposed SNR margin values comprises lowering the current setting for the proposed SNR margin value by an amount equal to a percentage of a difference between the current setting for the SNR margin value and the SNR minimum value. Embodiment 15. The system of embodiment 12, further including the one or more processors configured to: determine that none of the proposed SNR margin values greater than the SNR minimum value provides a telemetry communications format that includes the number of bits allocatable over the set of available frequency channels that is greater than or equal to the total number of bits b_total, and output a warning message including an indication that the total number of bits that may be allocated to the available frequency channels using any of the proposed SNR margin values can accommodate the total number of bits b_total being allocated over the available set of frequency channels while still meeting the requirements for the minimum total telemetry data rate and the maximum (BER).

Embodiment 16. The system of any of embodiments 10 to 15, further including the one or more processors configured to: determine that none of the one or more proposed signal-to-noise (SNR) margin values having value greater than the SNR minimum value provides a telemetry communications format that includes the number of bits allocatable over the set of available frequency channels that is greater than or equal to the total number of bits b_total; automatically placing into a silent mode one or more devices included in the logging tool; and format the telemetry communications to be performed as part of a logging operation of a wellbore including providing communication signals between the modem and the one or more devices of the logging tool that are not placed into the silent more. Embodiment 17. The system of embodiment 16, wherein at least one of the logging tools comprises a High-Fidelity Borehole Imager configured to provide information related to a micro-resistivity associated with a borehole environment.

Embodiment 18. A non-transitory, computer-readable medium having instructions stored thereon that are executable by a processor of a computing device to perform operations comprising: determining a total number of bits b_total required to be allocated over a set of available frequency channels configured as a discrete multi-tone (DMT) communications format to enable telemetry communications between a modem and a logging tool while meeting requirements for a minimum total telemetry data rate and a maximum bit-error-rate (BER) for the telemetry communications; setting one or more proposed signal-to-noise (SNR) margin values, each of the one or more proposed SNR margin values greater than a SNR minimum value, wherein the SNR minimum value is a minimum SNR value that may be untiled in the DMT data communications format while meeting the requirements for the minimum total telemetry data rate the maximum bit-error-rate (BER); and for each of the one or more proposed SNR margin values, performing a bit allocation procedure to determine a number of bits that are allocatable over the set of available frequency channels based a current setting for the proposed SNR margin values, and determining, by modem, whether the number of bits allocatable over the set of available frequency channels using the current setting for the proposed SNR margin value is greater than or equal to the total number of bits b_total.

Embodiment 19. The non-transitory, computer-readable medium of embodiment 18, having instructions stored thereon that are executable by a processor of a computing device to perform operations further comprising: determining whether the number of bits allocatable is greater than or equal to the total number of bits b_total, includes determining that the number of bits allocatable based on the current setting for the proposed SNR margin value is greater than or equal to the total number of bits b_total, and formatting the telemetry communications to be performed as part of a logging operation of a wellbore including providing communication signals between the modem and the logging tool using the bit allocations and the set of available frequency channels determined to provide the number of bits greater than or equal to the total number of bits b_total based on the current setting for the proposed SNR margin. Embodiment 20. The non-transitory, computer-readable medium of embodiment 18, wherein determining whether the number of bits allocatable is greater than or equal to the total number of bits b_total further includes: determining that the number of bits allocatable based on the current setting for the proposed SNR margin value is less than the total number of bits b_total, iteratively lower the current setting for the proposed SNR margin value to one or more newly proposed SNR margin values, each of the one or more newly proposed SNR margin values less than the current setting for the proposed SNR margin and greater than the SNR minimum value, and for each of the iteratively lowered current settings for the proposed SNR margin values, performing, by the modem, a bit allocation procedure to determine a number of bits that are allocatable over the set of available frequency channels based iteratively lower current setting for the proposed SNR margin values, and determining, by modem, whether the number of bits allocatable over the set of available frequency channels using the iteratively lowered current setting for the proposed SNR margin value is greater than or equal to the total number of bits b_total.

What is claimed is:

1. A method comprising:
    determining, by a modem, a total number of bits required to be allocated over a set of available frequency channels configured as a discrete multi-tone (DMT) data communications format to enable telemetry communications between the modem and a logging tool while meeting requirements for a minimum total telemetry data rate and a maximum bit-error-rate (BER) for the telemetry communications;
    setting, by the modem, one or more proposed signal-to-noise (SNR) margin values, each of the one or more proposed SNR margin values greater than a SNR minimum value, wherein the SNR minimum value is a minimum SNR value that may be untiled in the DMT data communications format while meeting the requirements for the minimum total telemetry data rate the maximum bit-error-rate (BER); and
    for each of the one or more proposed SNR margin values, performing, by the modem, a bit allocation procedure to determine a number of bits that are allocatable over the set of available frequency channels based a current setting for the proposed SNR margin values, and determining, by the modem, whether the number of bits allocatable over the set of available frequency channels using the current setting for the proposed SNR margin value is greater than or equal to the total number of bits.

2. The method of claim 1, wherein determining whether the number of bits allocatable is greater than or equal to the total number of bits further includes determining that the number of bits allocatable based on the current setting for the proposed SNR margin value is greater than or equal to the total number of bits, and
    formatting the telemetry communications to be performed as part of a logging operation of a wellbore including providing communication signals between the modem and the logging tool using the bit allocations and the set of available frequency channels determined to provide the number of bits greater than or equal to the total number of bits based on the current setting for the proposed SNR margin.

3. The method of claim 1, wherein determining whether the number of bits allocatable is greater than or equal to the total number of bits further includes determining that the number of bits allocatable based on the current setting for the proposed SNR margin value is less than the total number of bits,
   iteratively lowering a current setting for the proposed SNR margin value to one or more newly proposed SNR margin values, each of the one or more newly proposed SNR margin values less than the current setting for the proposed SNR margin and greater than the SNR minimum value, and
   for each of the iteratively lowered current setting for the proposed SNR margin values, performing, by the modem, a bit allocation procedure to determine a number of bits that are allocatable over the set of available frequency channels based iteratively lower current setting for the proposed SNR margin values, and determining, by modem, whether the number of bits allocatable over the set of available frequency channels using the iteratively lowered current setting for the proposed SNR margin value is greater than or equal to the total number of bits.

4. The method of claim 3, wherein iteratively lowering the current setting for the proposed SNR margin value to a next one of the one or more newly proposed SNR margin values comprises lowering the current setting for the proposed SNR margin value by a predetermined amount to set the next one of the one or more newly proposed SNR margin values.

5. The method of claim 3, wherein iteratively lowering the current setting for the proposed SNR margin value to a next one of the one or more newly proposed SNR margin values comprises lowering the current setting for the proposed SNR margin value by an amount equal to a percentage of a difference between the current setting for the SNR margin value and the SNR minimum value.

6. The method of claim 3, further comprising:
   determining that none of the proposed SNR margin values greater than the SNR minimum value provides a telemetry communications format that includes the number of bits allocatable over the set of available frequency channels that is greater than or equal to the total number of bits, and
   outputting, by the modem, a warning message including an indication that the total number of bits that may be allocated to the available frequency channels using any of the proposed SNR margin values can accommodate the total number of bits required number of bits being allocated over the available set of frequency channels while still meeting the requirements for the minimum total telemetry data rate and the maximum (BER).

7. The method of claim 1, further comprising:
   determining that none of the one or more proposed signal-to-noise (SNR) margin values having value greater than the SNR minimum value provides a telemetry communications format that includes the number of bits allocatable over the set of available frequency channels that is greater than or equal to the total number of bits;
   automatically placing into a silent mode one or more devices included in the logging tool; and
   formatting the telemetry communications to be performed as part of a logging operation of a wellbore including providing communication signals between the modem and the one or more devices of the logging tool that are not placed into the silent more.

8. The method of claim 1, further comprising;
   receiving, at the modem, an input indicating that one or more of the set of frequency channels are to be designated as unavailable, and that performing the bit allocation procedure to determine a number of bits that are allocatable over the set of available frequency channels comprises not allocating bits to the frequency channels designated as being unavailable.

9. The method of claim 1, further comprising,
   receiving, by the modem, a tool string service profile including a data rate value for the minimum total telemetry data rate, and a BER value for the maximum bit-error-rate (BER) for the telemetry communications to be provided between the modem and the logging tool.

10. A system comprising;
   a downhole logging tool comprising one or more sensors configured to perform sensing in a downhole environment of a borehole;
   a surface modem configured to communicatively coupled to the logging tool, the surface modem comprising one or more processors configured to set up and perform data communications between the downhole tool and the surface modem while the logging tool is performing a logging operation of the borehole;
   the one or more processor configured to:
      determine a total number of bits required to be allocated over a set of available frequency channels configured as a discrete multi-tone (DMT) communications format to enable telemetry communications between the modem and a logging tool while meeting requirements for a minimum total telemetry data rate and a maximum bit-error-rate (BER) for the telemetry communications;
      set one or more proposed signal-to-noise (SNR) margin values, each of the one or more proposed SNR margin values greater than a SNR minimum value, wherein the SNR minimum value is a minimum SNR value that may be untiled in the DMT data communications format while meeting the requirements for the minimum total telemetry data rate the maximum bit-error-rate (BER); and
      for each of the one or more proposed SNR margin values, perform a bit allocation procedure to determine a number of bits that are allocatable over the set of available frequency channels based a current setting for the proposed SNR margin values, and determining, by modem, whether the number of bits allocatable over the set of available frequency channels using the current setting for the proposed SNR margin value is greater than or equal to the total number of bits.

11. The system of claim 10, wherein determining whether the number of bits allocatable is greater than or equal to the total number of bits further includes the one or more processors configured to:
   determine that the number of bits allocatable based on the current setting for the proposed SNR margin value is greater than or equal to the total number of bits, and
   format the telemetry communications to be performed as part of a logging operation of a wellbore including providing communication signals between the modem and the logging tool using the bit allocations and the set of available frequency channels determined to provide the number of bits greater than or equal to the total number of bits based on the current setting for the proposed SNR margin.

12. The system of claim 10, wherein determining whether the number of bits allocatable is greater than or equal to the total number of bits further includes the one or more processors further configured to:
   determine that the number of bits allocatable based on the current setting for the proposed SNR margin value is less than the total number of bits,
   iteratively lowering the current setting for the proposed SNR margin value to one or more newly proposed SNR margin values, each of the one or more newly proposed SNR margin values less than the current setting for the proposed SNR margin and greater than the SNR minimum value, and
   for each of the iteratively lower current setting for the proposed SNR margin values, perform a bit allocation procedure to determine a number of bits that are allocatable over the set of available frequency channels based iteratively lower current setting for the proposed SNR margin values, and determining, by modem, whether the number of bits allocatable over the set of available frequency channels using the iteratively lowered current setting for the proposed SNR margin value is greater than or equal to the total number of bits.

13. The system of claim 12, wherein iteratively lowering the current setting for the proposed SNR margin value to a next one of the one or more newly proposed SNR margin values comprises lowering the current setting for the proposed SNR margin value by a predetermined amount to set the next one of the one or more newly proposed SNR margin values.

14. The system of claim 12, wherein iteratively lowering the current setting for the proposed SNR margin value to a next one of the one or more newly proposed SNR margin values comprises lowering the current setting for the proposed SNR margin value by an amount equal to a percentage of a difference between the current setting for the SNR margin value and the SNR minimum value.

15. The system of claim 12, further including the one or more processors configured to:
   determine that none of the proposed SNR margin values greater than the SNR minimum value provides a telemetry communications format that includes the number of bits allocatable over the set of available frequency channels that is greater than or equal to the total number of bits, and
   output a warning message including an indication that the total number of bits that may be allocated to the available frequency channels using any of the proposed SNR margin values can accommodate the total number of bits being allocated over the available set of frequency channels while still meeting the requirements for the minimum total telemetry data rate and the maximum (BER).

16. The system of claim 10, further including the one or more processors configured to:
   determine that none of the one or more proposed signal-to-noise (SNR) margin values having value greater than the SNR minimum value provides a telemetry communications format that includes the number of bits allocatable over the set of available frequency channels that is greater than or equal to the total number of bits;

automatically placing into a silent mode one or more devices included in the logging tool; and
   format the telemetry communications to be performed as part of a logging operation of a wellbore including providing communication signals between the modem and the one or more devices of the logging tool that are not placed into the silent more.

17. The system of claim 16, wherein at least one of the logging tools comprises a High-Fidelity Borehole Imager configured to provide information related to a micro-resistivity associated with a borehole environment.

18. A non-transitory, computer-readable storage medium having instructions stored thereon that are executable by a processor of a computing device to perform operations comprising:
   determining a total number of bits required to be allocated over a set of available frequency channels configured as a discrete multi-tone (DMT) communications format to enable telemetry communications between a modem and a logging tool while meeting requirements for a minimum total telemetry data rate and a maximum bit-error-rate (BER) for the telemetry communications;
   setting one or more proposed signal-to-noise (SNR) margin values, each of the one or more proposed SNR margin values greater than a SNR minimum value, wherein the SNR minimum value is a minimum SNR value that may be untiled in the DMT data communications format while meeting the requirements for the minimum total telemetry data rate the maximum bit-error-rate (BER); and
   for each of the one or more proposed SNR margin values, performing a bit allocation procedure to determine a number of bits that are allocatable over the set of available frequency channels based a current setting for the proposed SNR margin values, and determining, by modem, whether the number of bits allocatable over the set of available frequency channels using the current setting for the proposed SNR margin value is greater than or equal to the total number of bits.

19. The non-transitory, computer-readable storage medium of claim 18, having instructions stored thereon that are executable by a processor of a computing device to perform operations further comprising:
   determining whether the number of bits allocatable is greater than or equal to the total number of bits, includes determining that the number of bits allocatable based on the current setting for the proposed SNR margin value is greater than or equal to the total number of bits, and
   formatting the telemetry communications to be performed as part of a logging operation of a wellbore including providing communication signals between the modem and the logging tool using the bit allocations and the set of available frequency channels determined to provide the number of bits greater than or equal to the total number of bits based on the current setting for the proposed SNR margin.

20. The non-transitory, computer-readable storage medium of claim 18, wherein determining whether the number of bits allocatable is greater than or equal to the total number of bits further includes:
   determining that the number of bits allocatable based on the current setting for the proposed SNR margin value is less than the total number of bits,
   iteratively lower the current setting for the proposed SNR margin value to one or more newly proposed SNR margin values, each of the one or more newly proposed SNR margin values less than the current setting for the proposed SNR margin and greater than the SNR minimum value, and for each of the iteratively lowered current settings for the proposed SNR margin values, performing, by the modem, a bit allocation procedure to determine a number of bits that are allocatable over the set of available frequency channels based iteratively lower current setting for the proposed SNR margin values, and determining, by modem, whether the number of bits allocatable over the set of available frequency channels using the iteratively lowered current setting for the proposed SNR margin value is greater than or equal to the total number of bits.

\* \* \* \* \*